(12) United States Patent
Yoshioka et al.

(10) Patent No.: US 9,908,971 B2
(45) Date of Patent: Mar. 6, 2018

(54) MULTI-ARM POLYETHYLENE GLYCOL DERIVATIVE, INTERMEDIATE THEREOF, AND METHOD FOR PRODUCING SAME

(71) Applicant: NOF CORPORATION, Tokyo (JP)

(72) Inventors: Hiroki Yoshioka, Kawasaki (JP); Midori Hirai, Kawasaki (JP); Hitoshi Nakatsuhara, Kawasaki (JP); Yuji Yamamoto, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 0 days.

(21) Appl. No.: 15/216,573

(22) Filed: Jul. 21, 2016

(65) Prior Publication Data

US 2016/0326317 A1    Nov. 10, 2016

Related U.S. Application Data

(62) Division of application No. 14/389,459, filed as application No. PCT/JP2013/059243 on Mar. 28, 2013, now Pat. No. 9,428,609.

(30) Foreign Application Priority Data

Mar. 30, 2012  (JP) ................................ 2012-079941

(51) Int. Cl.
    *C08G 65/329*  (2006.01)
    *C08G 65/26*   (2006.01)
    *C08G 65/333*  (2006.01)
    *C08G 65/332*  (2006.01)

(52) U.S. Cl.
    CPC ..... *C08G 65/2609* (2013.01); *C08G 65/2696* (2013.01); *C08G 65/329* (2013.01); *C08G 65/3322* (2013.01); *C08G 65/33306* (2013.01); *C08G 65/33337* (2013.01); *C08G 65/33368* (2013.01); *C08G 65/33389* (2013.01); *C08G 2650/30* (2013.01)

(58) Field of Classification Search
    CPC combination set(s) only.
    See application file for complete search history.

(56) References Cited

U.S. PATENT DOCUMENTS

| | | | |
|---|---|---|---|
| 4,572,907 A | 2/1986 | Nadzan et al. | |
| 5,521,160 A | 5/1996 | Chucholowski et al. | |
| 6,858,736 B2 | 2/2005 | Nho et al. | |
| 8,071,712 B2 * | 12/2011 | Sakanoue | A61K 47/48215 528/425 |
| 2010/0029899 A1 | 2/2010 | Sakanoue et al. | |
| 2010/0261863 A1 | 10/2010 | Takehana et al. | |
| 2010/0286361 A1 | 11/2010 | Yoshimura et al. | |
| 2012/0077988 A1 | 3/2012 | Yamamoto et al. | |
| 2012/0322955 A1 | 12/2012 | Yoshioka et al. | |

FOREIGN PATENT DOCUMENTS

| | | |
|---|---|---|
| CN | 101622295 A | 1/2010 |
| CN | 102361912 A | 2/2012 |
| EP | 1400550 A1 | 3/2004 |
| EP | 2116561 A1 | 11/2009 |
| EP | 2 360 203 A1 | 8/2011 |
| EP | 2415799 A1 | 2/2012 |
| EP | 2415800 A1 | 2/2012 |
| JP | 2010-235450 A | 10/2010 |
| JP | 2010-254986 A | 11/2010 |
| WO | 2008/105514 A1 | 9/2008 |
| WO | 2010114073 A1 | 10/2010 |
| WO | 2011/093508 A1 | 8/2011 |
| WO | 2011/162252 A1 | 12/2011 |
| WO | 2012/133490 A1 | 10/2012 |

OTHER PUBLICATIONS

Communication dated Dec. 9, 2015 by the European Patent Office in related Application No. 13768770.3.
International Search Report dated May 21, 2013 issued in International Application No. PCT/JP2013/059243 (PCT/ISA/210).
Notification of the First Office Action dated Nov. 6, 2015 by The State Intellectual Property Office of PR China in related Application No. 201380018542.5.
Written Opinion dated May 21, 2013 issued in International Application No. PCT/JP2013/059243 (PCT/ISA/237).
Notice to Submit Response dated Nov. 15, 2017, issued by the Korean Intellectual Property Office in counterpart Korean Application No. 10-2014-7027529.

* cited by examiner

*Primary Examiner* — Amanda L Aguirre
(74) *Attorney, Agent, or Firm* — Sughrue Mion, PLLC

(57) ABSTRACT

A multi-arm polyethylene glycol derivative having a narrow molecular weight distribution represented by the formula (1):

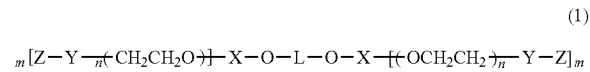

(1)

wherein, L represents a group selected from a linear or branched alkylene, arylene, or cycloalkylene group having two or more carbon atoms and combinations thereof, which may have an ether bond in a chain; X represents a dehydroxylation residue of a linear sugar alcohol having 5 or 7 carbon atoms; m is the number of polyethylene glycol chains bonded to X and represents 4 or 6; n is the average addition molar number of oxyethylene groups and represents an integer of 3 to 600; Y represents a single bond or an alkylene group as further defined herein; and Z represents a chemically reactive functional group.

4 Claims, 2 Drawing Sheets

MULTI-ARM POLYETHYLENE GLYCOL DERIVATIVE, INTERMEDIATE THEREOF, AND METHOD FOR PRODUCING SAME

CROSS-REFERENCE TO RELATED APPLICATIONS

This is a Rule 53(b) Divisional application of U.S. application Ser. No. 14/389,459 filed Sep. 30, 2014, which is a National Stage of International Application No. PCT/JP2013/059243 filed Mar. 28, 2013, which claims benefit of Japanese Patent Application No. 2012-079941 filed on Mar. 30, 2012, the contents of all of which are incorporated herein by reference in their entirety.

TECHNICAL FIELD

The present invention relates to a multi-arm polyethylene glycol derivative having a narrow molecular weight distribution, an intermediate thereof, and a method for producing the same.

BACKGROUND ART

A drug delivery system (DDS) has been increasingly used in therapeutic applications for various diseases as an ideal administration form of pharmaceutical agents. Especially, there has been widely investigated a development for improving blood circulation by modifying a pharmaceutical agent with polyethylene glycol, and there have been placed on the market pharmaceutical agents in which a cytokine such as interferon or GCSF is modified with polyethylene glycol. Heretofore, in polyethylene glycol derivatives, a type of derivatives having one reactive functional group at an end of polyethylene glycol is common but, in recent years, a multi-arm polyethylene glycol in which plural functional groups are introduced in one molecule has been used. Since the multi-arm polyethylene glycol has plural reactive points with a drug, there may be mentioned an advantage that a dose of the drug per unit weight can be increased. However, in the case where the polyethylene glycol derivative contains one having a different number of functional groups, there are contained those in which the number of the drugs modified with one molecule of polyethylene glycol is different, so that there arises a problem that the drug is not homogeneous as a pharmaceutical.

In addition, utilizing high water-solubility and biocompatibility of polyethylene glycol, there has been also advanced a development of water-swelling polyethylene glycol hydrogel in which polyethylene glycol and other molecule are combined. Various applications of the polyethylene glycol hydrogel has been investigated in biological and medical fields, for example, adhesive/hemostatic agents, adhesion prevention agents, carriers for drug controlled release, regenerative medical materials, and the like. Also as polyethylene glycol for the hydrogel uses, multi-arm type having more reactive points is useful for forming a cross-linked structure with the other molecule. Particularly, in the case where the hydrogel is used as a carrier for drug controlled release or a regenerative medical material, a quality of a narrower molecular weight distribution is desired for strictly controlling permeation and a diffusion rate of a drug or a protein as a growth factor of a cell from the gel.

As a raw material for the multi-arm polyethylene glycol, it is common to use a polyol corresponding to the desired number of functional groups. For example, ring-opening polymerization of ethylene oxide is conducted using glycerin or the like for three-arm one or pentaerythritol or the like for four-arm one as a raw material. Since these low-molecular-weight raw materials hardly contain impurities, it is possible to form polyethylene glycol of a high quality having a relatively narrow molecular weight distribution.

On the other hand, as six-arm and eight-arm polyethylene glycols, there have been known those using a polyglycerol such as tetraglycerin or hexaglycerin as a low-molecular-weight raw material. The polyglycerol is usually a mixture containing products having plural degrees of polymerization and/or isomers. Since it is difficult to purify the mixture into a single component owing to high polarity, a multi-arm polyethylene glycol of a low quality having a wide molecular weight distribution is formed when ethylene oxide is added thereto.

Against such a problem, there has been made an attempt to solve it by adding ethylene oxide using a low-molecular-weight compound having a high purity as a raw material. In Patent Document 1, six-arm and eight-arm polyethylene glycols have been synthesized using dipentaerythritol and tripentaerythritol as raw materials. Moreover, in Patent Document 2, a six-arm polyethylene glycol has been synthesized using sorbitol as a raw material.

PRIOR ART DOCUMENTS

Patent Documents

Patent Document 1: European Patent No. 2360203
Patent Document 2: U.S. Pat. No. 6,858,736

DISCLOSURE OF THE INVENTION

Problems that the Invention is to Solve

However, these polypentaerythritol and sorbitol, and aforementioned polyglycerols are all solids having an extremely high polarity, which have such many hydroxyl groups as 6 to 8 hydroxyl groups. Therefore, stirring in a reaction vessel becomes insufficient and thus homogeneous dispersion thereof with a catalyst and ethylene oxide is not achieved at the addition of ethylene oxide, so that there is a concern that a homogeneous polymerization does not take place and a polyethylene glycol having a wide molecular weight distribution is formed.

As above, although a multi-arm polyethylene glycol derivative having many branches has become an important material in novel biological and medical fields without limiting to DDS, the derivative has not been obtained with a quality of an extremely narrow molecular weight distribution and by an industrially easily producible method. Accordingly, it has been desired appearance of such a multi-arm polyethylene glycol derivative.

An object of the present invention is to provide a multi-arm polyethylene glycol derivative having a narrow molecular weight distribution, a method for producing the same, and an intermediate thereof.

Means for Solving the Problems

As a result of extensive studies for solving the above problem, the present inventors have found a multi-arm polyethylene glycol derivative having a novel backbone, a method for producing the same, and an intermediate thereof, and thus they have accomplished the invention.

Namely, the invention lies in the following.

[1] A multi-arm polyethylene glycol derivative represented by the following formula (1):

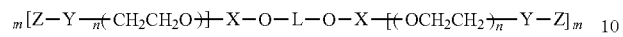
(1)

wherein L represents a group selected from a linear or branched alkylene, arylene, or cycloalkylene group having two or more carbon atoms and combinations thereof, which may have an ether bond in a chain; X represents a dehydroxylation residue of a linear sugar alcohol having 5 or 7 carbon atoms; m is the number of polyethylene glycol chains bonded to X and represents 4 or 6; n is the average addition molar number of oxyethylene groups and n represents an integer of 3 to 600; Y represents a single bond or an alkylene group which may have an ester bond, a urethane bond, an amide bond, an ether bond, a carbonate bond, a secondary amino group, a urea bond, a thioether bond or a thioester bond in a chain or at an end; and Z represents a chemically reactive functional group.

[2] The multi-arm polyethylene glycol derivative according to [1], which is represented by the following formula (2):

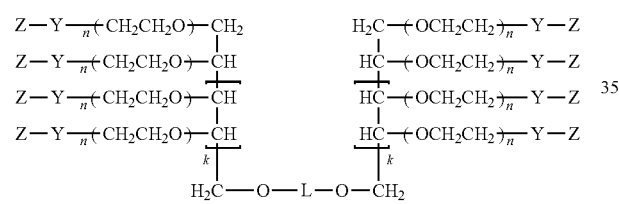
(2)

wherein L represents a group selected from a linear or branched alkylene, arylene, or cycloalkylene group having two or more carbon atoms and combinations thereof, which may have an ether bond in a chain; k represents 1 or 2; n is the average addition molar number of oxyethylene groups and n represents an integer between 3 and 600; Y represents a single bond or an alkylene group which may have an ester bond, a urethane bond, an amide bond, an ether bond, a carbonate bond, a secondary amino group, a urea bond, a thioether bond or a thioester bond in a chain or at an end; and Z represents a chemically reactive functional group.

[3] The multi-arm polyethylene glycol derivative according to [2], which is represented by the following formula (3):

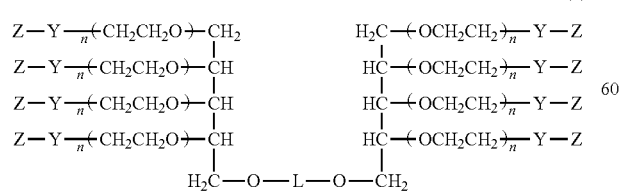
(3)

wherein L represents a group selected from a linear or branched alkylene, arylene, or cycloalkylene group having two or more carbon atoms and combinations thereof, which may have an ether bond in a chain; n is the average addition molar number of oxyethylene groups and n represents an integer between 3 and 600; Y represents a single bond or an alkylene group which may have an ester bond, a urethane bond, an amide bond, an ether bond, a carbonate bond, a secondary amino group, a urea bond, a thioether bond or a thioester bond in a chain or at an end; and Z represents a chemically reactive functional group.

[4] The multi-arm polyethylene glycol derivative according to any one of [1] to [3], wherein L is an alkylene group having 3 to 8 carbon atoms.

[5] The multi-arm polyethylene glycol derivative according to [4], wherein L is an n-butylene group.

[6] The multi-arm polyethylene glycol derivative according to any one of [1] to [5], wherein Z is one or more groups selected from the group consisting of the following formula (a), formula (b), formula (c), formula (d), formula (e), formula (f), formula (g), formula (h), formula (i), formula (j), formula (k), formula (l), formula (m), formula (n), formula (o), and formula (p):

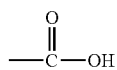
(a)

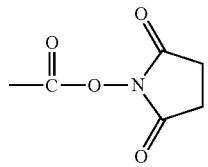
(b)

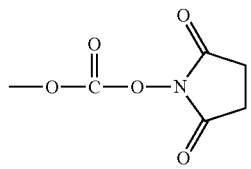
(c)

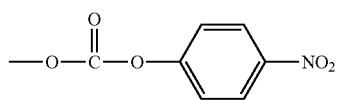
(d)

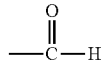
(e)

(f)

(g)

(h)

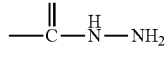

(i)

(j)

(k)

(l)

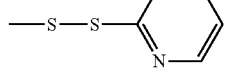

-continued

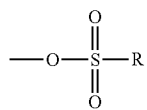 (m)

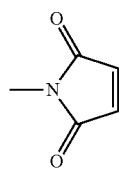 (n)

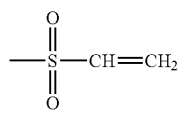 (o)

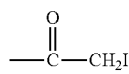 (p)

wherein R represents a hydrocarbon group having 1 to 10 carbon atoms, which may contain a fluorine atom.

[7] The multi-arm polyethylene glycol derivative according to any one of [1] to [6], wherein polydispersity Mw/Mn satisfies the relationship of Mw/Mn≤1.05 in gel permeation chromatography.

[8] The multi-arm polyethylene glycol derivative according to any one of [1] to [7], wherein the number m of polyethylene glycol chains bonded to X is 4.

[9] An intermediate of the multi-arm polyethylene glycol derivative according to [2], which is represented by the following formula (4):

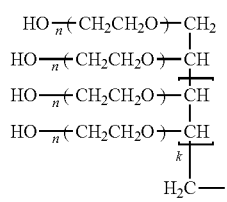
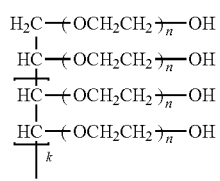
(4)

wherein L represents a group selected from a linear or branched alkylene, arylene, or cycloalkylene group having two or more carbon atoms and combinations thereof, which may have an ether bond in a chain; k represents 1 or 2; n is the average addition molar number of oxyethylene groups and n represents an integer between 3 and 600.

[10] The intermediate according to [9], which is represented by the following formula (5):

(5)

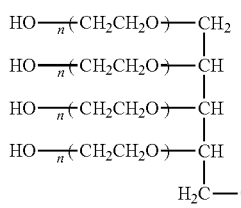
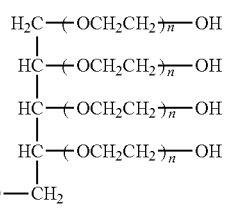

wherein L represents a group selected from a linear or branched alkylene, arylene, or cycloalkylene group having two or more carbon atoms and combinations thereof, which may have an ether bond in a chain; n is the average addition molar number of oxyethylene groups and n represents an integer between 3 and 600.

[11] The intermediate according to [9] or [10], wherein polydispersity Mw/Mn satisfies the relationship of Mw/Mn≤1.05 in gel permeation chromatography.

[12] A method for producing the intermediate according to anyone of [9] to [11], the method comprising all the steps of the following (A), (B), and (C) in the order:

Step (A): a step of linking two molecules of a compound represented by the formula (6) to a compound represented by the formula (7) by an etherification reaction to obtain a compound represented by the formula (8):

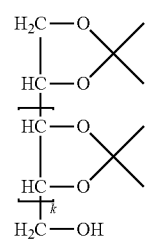 (6)

wherein k represents 1 or 2;

A-L-A (7)

wherein L represents a group selected from a linear or branched alkylene, arylene, or cycloalkylene group having two or more carbon atoms and combinations thereof, which may have an ether bond in a chain; and A represents a halogen atom selected from chlorine, bromine, and iodine or a sulfone-based protective group;

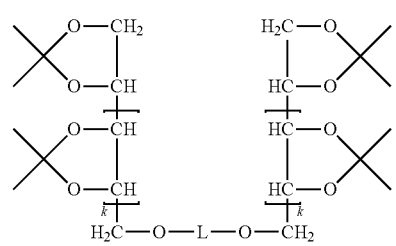 (8)

wherein L represents a group selected from a linear or branched alkylene, arylene, or cycloalkylene group having two or more carbon atoms and combinations thereof, which may have an ether bond in a chain; and k represents 1 or 2;

Step (B): a step of obtaining a compound represented by the formula (9) by acid hydrolysis of the compound represented by the formula (8):

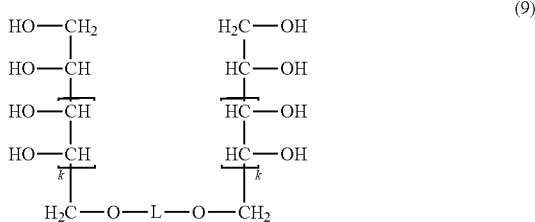

(9)

wherein L represents a group selected from a linear or branched alkylene, arylene, or cycloalkylene group having two or more carbon atoms and combinations thereof, which may have an ether bond in a chain; and k represents 1 or 2;

Step (C): a step of adding ethylene oxide to the compound represented by the formula (9) using one or more compounds selected from the group consisting of potassium hydroxide, sodium hydroxide, sodium methoxide, metal sodium, metal potassium, and potassium t-butoxide as a catalyst in the presence of an organic solvent to obtain an intermediate of a polyethylene glycol derivative represented by the formula (4):

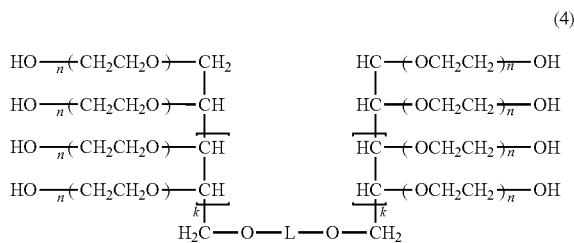

(4)

wherein L represents a group selected from a linear or branched alkylene, arylene, or cycloalkylene group having two or more carbon atoms and combinations thereof, which may have an ether bond in a chain; k represents 1 or 2; n is the average addition molar number of oxyethylene groups and n represents an integer between 3 and 600.

Advantage of the Invention

The novel multi-arm polyethylene glycol derivative (1) according to the invention has a hydrophobic linking group having an affinity to an organic solvent in the backbone. Accordingly, at the time of ethylene oxide addition, dispersion into an organic solvent is achieved in spite of the presence of many hydroxyl groups and thereby the polymerization reaction homogeneously takes place, so that high-quality one having an extremely narrow molecular weight distribution can be provided.

Moreover, with regard to the novel multi-arm polyethylene glycol derivative (1) according to the invention, at the step of synthesizing a low-molecular-weight raw material that is to be a raw material, it is possible to purify at a stage of an intermediate having low polarity and viscosity in which polyols are protected. Therefore, the purification is more simple and convenient and the purified low-molecular-weight raw material hardly contains impurities different in the number of functional groups, so that high-quality one having an extremely narrow molecular weight distribution can be provided.

MODES FOR CARRYING OUT THE INVENTION

Figure 1:
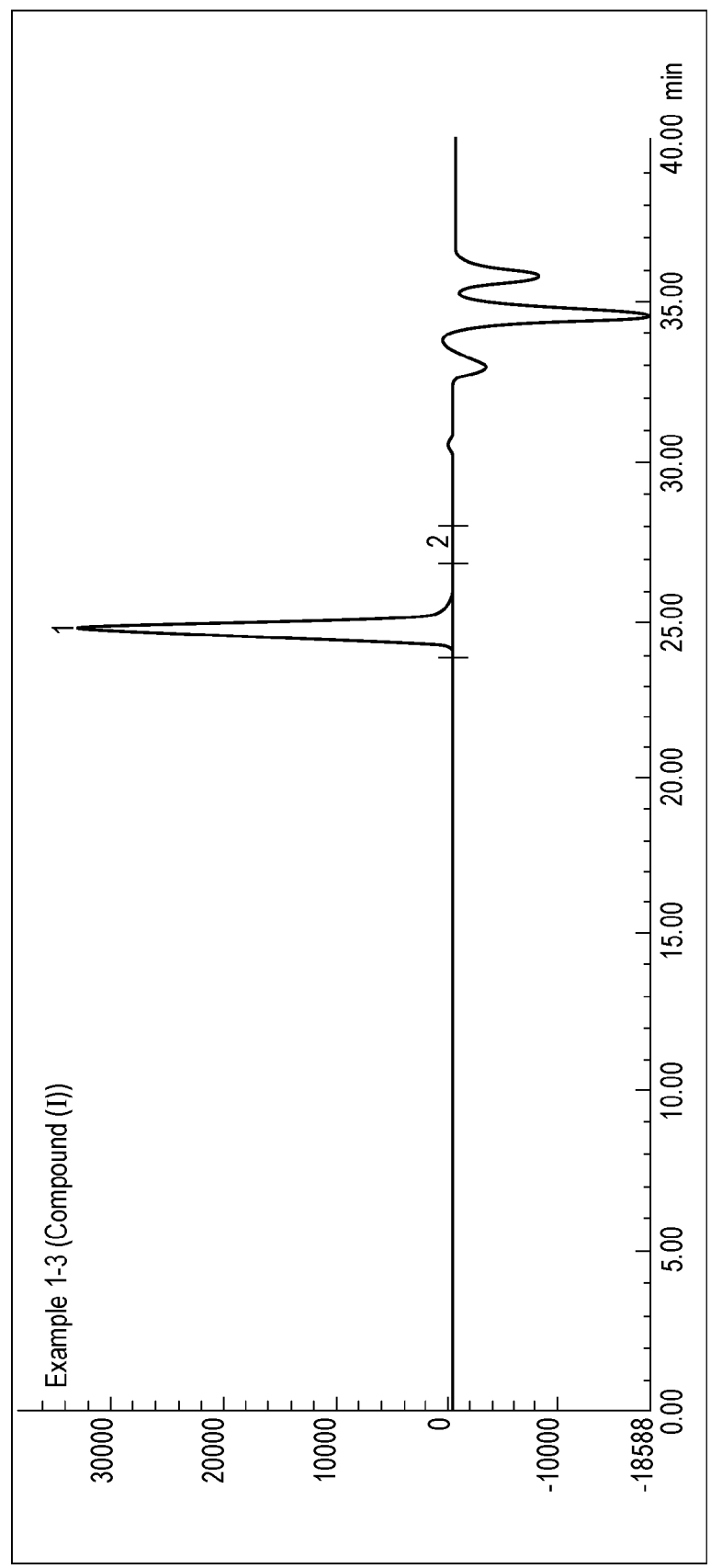
FIG. 1 is a GPC chart of the compound (I).

L in the formula (1) of the invention represents a group selected from a linear or branched alkylene, arylene, or cycloalkylene group having two or more carbon atoms and combinations thereof, which may have an ether bond in a chain.

As the alkylene group, there may be mentioned those having 2 to 12 carbon atoms (alkylene groups having more preferably 3 to 8 carbon atoms, further preferably 4 carbon atoms). Specific examples thereof include, for example, an ethylene group, a propylene group, an isopropylene group, an n-butylene group, an s-butylene group, a t-butylene group, a pentamethylene group, a hexamethylene group, a heptamethylene group, an octamethylene group, a nonamethylene group, a decamethylene group, an undecamethylene group, a dodecamethylene group, and the like.

The arylene group constituting L is a substituted or unsubstituted arylene group having 6 to 12 carbon atoms and, for example, a phenylene group, a naphthylene group, an anthrylene group, and the like may be mentioned. Moreover, as the cycloalkylene group constituting L, cycloalkylene groups having 5 to 12 carbon atoms may be mentioned and specific examples thereof include, for example, a cyclopentylene group, a cyclohexylene group, a cycloheptylene group, a cyclooctylene group, a cyclononylene group, a cyclodecylene group, and the like. Furthermore, these groups may be combined and may have an ether bond in a chain for combination. For example, an alkyleneoxyalkylene group, an aryloxyalkylene group, and the like may be mentioned.

In the case where L has less than two carbon atoms, since the effect as a hydrophobic group is not exhibited, ethylene oxide is not dispersed in an organic solvent at the time when ethylene oxide is added and thus there is a concern that a molecular weight distribution is broadened. Moreover, in the case where L has more than 12 carbon atoms, since surface active performance of the molecule increases, there is a concern that an expected performance is not exhibited in the case where an application as a pharmaceutical modifier is considered. L is preferably a propylene group, an isopropylene group, an n-butylene group, an s-butylene group, a t-butylene group, a pentamethylene group, a hexamethylene group, a heptamethylene group, or an octamethylene group, and more preferably an n-butylene group.

X represents a dehydroxylation residue of a linear sugar alcohol having 5 or 7 carbon atoms. One of the carbon atoms of X is bonded to L through an ether bond and the remaining carbon atoms are bonded to the polyethylene glycol chain through an ether bond. At the step of synthesizing a raw material of the intermediate of the polyethylene glycol derivative, since it is necessary for the sugar alcohol to protect, as cyclic acetal(s), the polyol structure other than one hydroxyl group that is to be bonded to L, X is necessarily a dehydroxylation residue of a linear sugar alcohol having an odd number of carbon atoms, i.e., 5 or 7 carbon atoms.

As the linear sugar alcohol having 5 or 7 carbon atoms, for example, there may be mentioned D-arabinitol, L-arabinitol, xylitol, ribitol, bolemitol, perseitol, and the like and it is preferably xylitol. m is the number of polyethylene glycol chains bonded to X and represents 4 or 6 and is preferably 4. k represents 1 or 2 and is preferably 1.

n is the average addition molar number of oxyethylene groups and n represents an integer of 3 to 600, and is preferably from 5 to 300, more preferably from 13 to 250.

Y is a linker between the polyoxyethylene group and the reactive functional group Z. There is a case where the linker Y does not contain any atom and the case is defined as a single bond. These are not particularly limited so long as they are conjugated bonds and may be any one so long as they are bonds usually used as linkers but there may be preferably mentioned an alkylene group alone or an alkylene group which may have an ether bond, an ester bond, a urethane bond, an amide bond, a carbonate bond, a secondary amino group, a urea bond, a thioether bond or a thioester bond in the alkylene chain or at an end thereof. The number of carbon atoms of the alkylene group is preferably from 1 to 12.

As a preferably example of the alkylene group, a structure like (y1) may be mentioned. As a preferably example of the alkylene group having an ether bond, a structure like (y2) may be mentioned. As a preferably example of the alkylene group having an ester bond, a structure like (y3) may be mentioned. As a preferably example of the alkylene group having a urethane bond, a structure like (y4) may be mentioned. As a preferably example of the alkylene group having an amide bond, a structure like (y5) may be mentioned. As a preferably example of the alkylene group having a carbonate bond, a structure like (y6) may be mentioned. As a preferably example of the alkylene group having a secondary amino group, a structure like (y7) may be mentioned. As a preferably example of the alkylene group having a urea bond, a structure like (y8) may be mentioned. As a preferably example of the alkylene group having a thioether bond, a structure like (y9) may be mentioned. As a preferably example of the alkylene group having a thioester bond, a structure like (y10) may be mentioned.

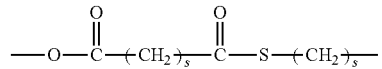

(y10)

In each formula, s is an integer of 0 to 12. The range of s is from 0 to 12. For example, in the case where it is intended to perform bonding under a hydrophobic environment like the inside of a protein, s is preferably large and, in the case where it is intended to perform bonding under a hydrophilic environment, s is preferably small.

The symbols s in (y5), (y6), (y7), (y8), (y9), and (y10) may be the same or different.

Z is not particularly limited so long as it is a functional group capable of reacting with a hydroxyl group, an amino group, a mercapto group, an aldehyde, a carboxyl group, a triple bond, or an azido group to form a chemical bond with another substance. For example, there may be mentioned functional groups described in "POLY(ETHYLENE GLYCOL) CHEMISTRY" written by J. Milton Harris, "Bioconjugate Techniques second edition" (2008) written by Greg T. Hermanson, and "Pegylated Protein Drug: basic Science and Clinical Application" (2009) written by Francesco M. Veronese, and the like.

Further specifically, as Z, there may be mentioned functional groups containing a carboxylic acid, an active ester, an active carbonate, an aldehyde, an amine, an oxyamine, a hydrazide, an azide, an unsaturated bond, a thiol, a dithiopyridine, a sulfone, a maleimide, a vinylsulfone, an α-iodoacetyl, an acrylate, an isocyanate, an isothiocyanate, an epoxide), or the like.

Preferably, Z is one or more groups selected from the group consisting of the following formula (a), formula (b), formula (c), formula (d), formula (e), formula (f), formula (g), formula (h), formula (i), formula (j), formula (k), formula (l), formula (m), formula (n), formula (o), and formula (p):

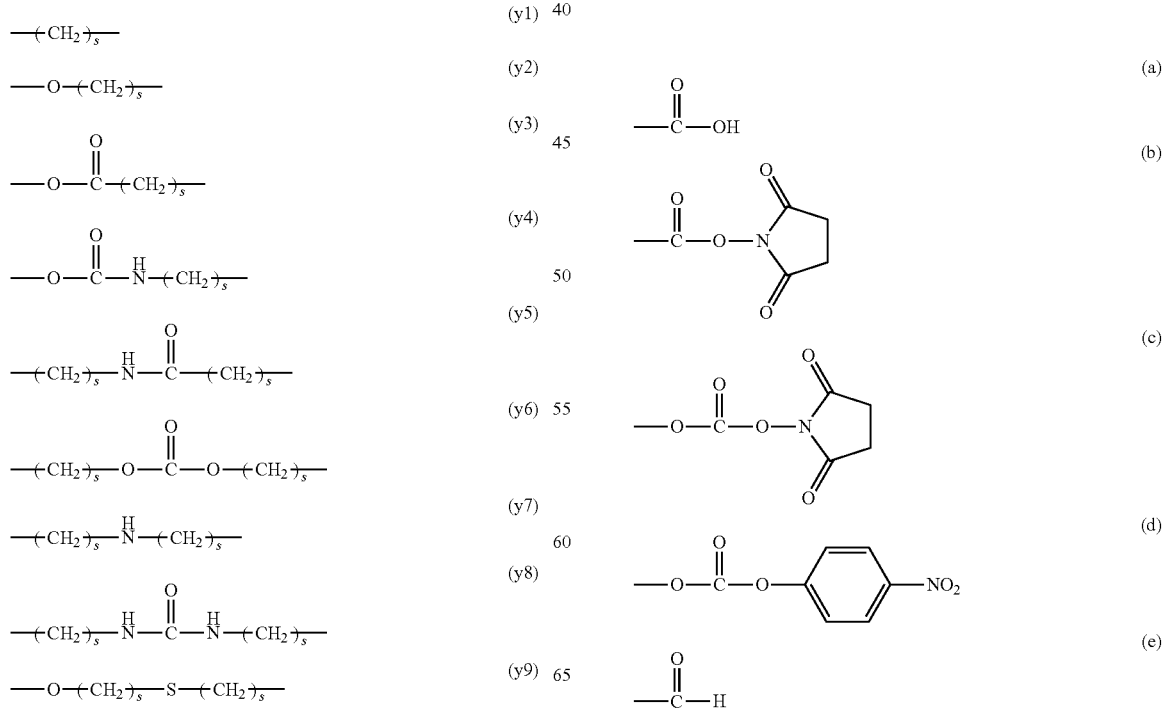

-continued

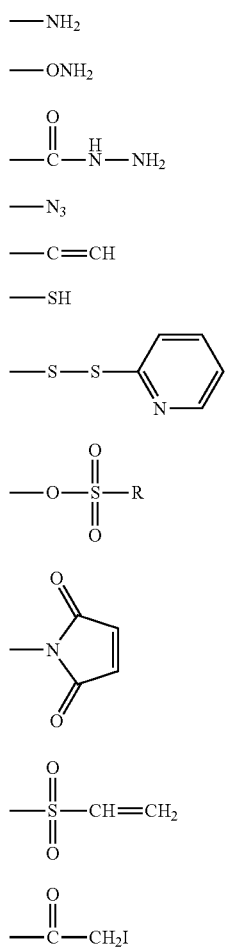

wherein R represents a hydrocarbon group having 1 to 10 carbon atoms, which may contain a fluorine atom.

In preferable embodiments in the reaction of the compound of the invention with the other substance, Z is a group represented by the group (i), (ii), (iii), (iv), (v), or (vi).
Group (i): a functional group capable of reacting with a hydroxyl group of the other substance
  (a), (b), (c), (m) mentioned above
Group (ii): a functional group capable of reacting with an amino group of the other substance
  (a), (b), (c), (d), (e), (m), (n) mentioned above
Group (iii): a functional group capable of reacting with a mercapto group of the other substance
  (a), (b), (c), (d), (e), (j), (k), (l), (m), (n), (o), (p) mentioned above
Group (iv): a functional group capable of reacting with an aldehyde or carboxyl group of the other substance
  (f), (g), (h), (k) mentioned above
Group (v): a functional group capable of reacting with a triple bond of the other substance
  (f), (g), (h), (i), (k) mentioned above
Group (vi): a functional group capable of reacting with an azido group of the other substance
  (j) mentioned above As the substance that forms a chemical bond with the compound of the invention, a bio-related substance or a raw material of a biomaterial. The "bio-related substance" in the invention specifically includes substances exemplified by an intercellular communication mediator such as a hormone or a cytokine, an antibody, an enzyme, an animal cell-constituting substance such as a phospholipid or a glycolipid, a body fluid-constituting substance such as blood or lymph but is not limited thereto and also is intended to include various substances present in a living body of an organism, substances that are converted into those in a living body, analogs thereof, or mimics thereof, or substances that interact with a substance present in a living body to exhibit a physiological activity or similar substances.

The "biomaterial" in the invention is a material that directly comes into contact with a living body or comes into contact with a living cell and a raw material thereof may be an organic or inorganic material. Specifically, there may be mentioned substances exemplified by natural polymers such as hyaluronic acid, polyamino acids, and polysaccharides, synthetic polymers such as polyesters, polymethyl methacrylate, and polyurethanes, ceramics such as hydroxyapatite and titanium oxide, and the like but, without limitation thereto, it is also intended to include substances having biocompatibility solely or in combination.

Production of Intermediate

The intermediate (4) of the multi-arm polyethylene glycol derivative of the invention can be, for example, produced as follows.

An etherification reaction is conducted between two molecules of a compound in which polyol structures other than one hydroxyl group of a sugar alcohol represented by the following formula (6) are protected as cyclic acetals and a compound having two leaving groups A represented by the formula (7) and only an objective compound (8) is isolated in a purification step (Step (A)). Then, the compound is hydrolyzed under acidic conditions to deprotect the cyclic acetal structures to obtain a compound represented by the formula (9) (Step (B)). Subsequently, 3 to 600 moles of ethylene oxide is polymerized to the newly formed hydroxyl group, whereby a compound represented by the formula (4) can be obtained (Step (C)).

A reaction path for the compound (4) is shown below.

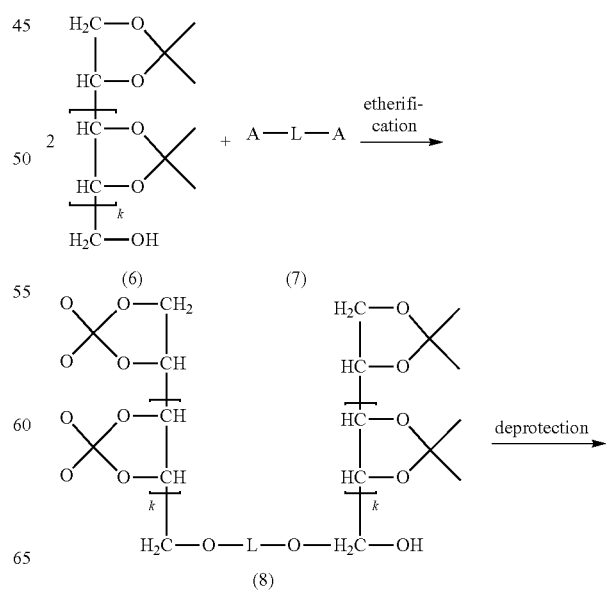

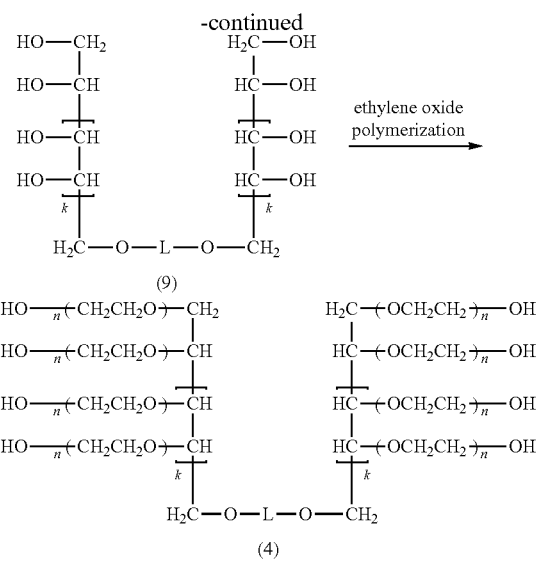

wherein respective symbols are the same as mentioned above.

Generally, in the case where a sugar alcohol having 5 to 7 hydroxyl groups is converted to a cyclic acetal, there is a possibility that an isomer of the compound of the formula (6), in which a remaining hydroxyl group is present at a position other than 1-position, may be formed. However, in the case of using as a raw material a compound in which the hydroxyl group present at a position other than 1-position remains, efficiency of etherification using the compound of the formula (7) is low. Accordingly, it is more preferred to use the sugar alcohol derivative having a structure of the formula (6), which selectively has a hydroxyl group at 1-position, as a raw material of the etherification reaction.

As above, by synthesizing a highly pure low-molecular-weight raw material, which is derivatized from a sugar alcohol, and using it in the ethylene oxide polymerization reaction, the intermediate (4) of a multi-arm polyethylene glycol derivative having an extremely narrow molecular weight distribution and a high quality can be produced by an industrially suitable method.

By using the thus obtained compound (4) having a narrow molecular weight distribution and functionalizing it into a chemically reactive group represented by —Y—Z, the multi-arm polyethylene glycol derivative of the formula (1) of the invention, in which the narrow molecular weight distribution is maintained, can be produced. On this occasion, the molecular weight distribution of the compound (4) that is an intermediate is maintained in the compound (1), into which a functional group is introduced, without large change owing to the high stability of the polyether structure of the backbone.

Moreover, the compound of the formula (1), in which the functional group Z is any one of (a) to (p), can be reacted with a bio-related substance or a raw material of a biomaterial. However, the compound (1) of the invention can be obtained by further reacting the compound of the formula (1), in which the functional group Z is any one of (a) to (p), as an intermediate with another compound. For example, the compound having a functional group of (a) or (n) can be obtained using the compound having a functional group of (f) as an intermediate.

Production of the compound (8) is not particularly limited but is preferably produced by the following step (A).

Step (A): A Step of Etherification of Two Molecules of the Compound (6) and the Compound (7) Through the Williamson Reaction In the compound (7) of the reaction, A is sufficiently a leaving group and examples thereof include halogen atoms such as chlorine, bromine, and iodine, sulfone-based leaving groups such as a methanesulfonyl group, a p-toluenesulfonyl group, and a trifluoromethanesulfonyl group, and the like. As a base for etherification, it is sufficient to form an alkali metal alkoxide, and there may be mentioned potassium t-butoxide, sodium hydride, potassium hydride, metal sodium, hexamethyldisilazane, potassium carbonate, and the like. The reaction solvent is not particularly limited so long as it is an aprotic solvent, and there may be mentioned tetrahydrofuran, dimethyl ether, methylene chloride, chloroform, dimethylformamide, toluene, benzene, and the like. More preferred are toluene and dimethylformamide. In no solvent, viscosity of the compound (6) is high and stirring efficiency is lowered, so that there is a concern that efficiency of the etherification is lowered.

In the crude product after the reaction, impurities such as vinyl-group bodies formed resulting from occurrence of E2 elimination of the compound (6) and the compound (7) are present. In case where these impurities are not removed, they are subjected to de-acetalization in the next step to form impurities having hydroxyl groups, the number of which is different from that of the objective compound, causing broadened molecular weight distribution in the case where ethylene oxide is added. Therefore, it is preferable to isolate the compound (8) through removal and purification at this stage. The method for the purification is not particularly limited but it is preferable to remove the impurities by a purification method such as liquid separation, column chromatography, distillation, or supercritical extraction and the purification is further preferably conducted by liquid separation and column chromatography. As a support in the case of purification by the column chromatography, there may be mentioned silica gel, chemically bonded silica gel, alumina, active carbon, magnesium silicate, polyamide, and the like but preferred is silica gel. As an eluent, there may be mentioned hexane, toluene, diethyl ether, chloroform, dichloromethane, acetone, ethyl acetate, acetonitrile, ethanol, methanol, acetic acid, and the like and the solvent may be a mixed solvent thereof and preferably a mixed solvent of hexane and ethyl acetate.

The deprotection reaction of the cyclic acetal structure following the etherification is not particularly limited but the production can be conducted by the following step (B).

Step (B): A Step of Deprotection by Reacting the Cyclic Acetal Structure of the Compound (8) in an Aqueous Solution in the Presence of an Acid Catalyst Through an Acid Hydrolysis Reaction to Produce the Compound (9)

The reaction can be conducted in water or a mixed solvent of a water-soluble solvent and water. As the water-soluble solvent, for example, methanol, ethanol, acetonitrile, or the like can be used. As the acid catalyst, organic acids, inorganic acids, solid acids, or the like may be mentioned. For example, there may be mentioned acetic acid, trifluoroacetic acid, and the like as the organic acids and phosphoric acid, sulfuric acid, hydrochloric acid, and the like as the inorganic acids, and Amberlyst, Diaion, and Dowex that are cation exchange resins as the solid acids, but preferred are the solid acids capable of being removed from the objective products through filtration alone after the reaction. Reaction temperature is usually from 20 to 100° C., preferably from 40 to 90° C. Reaction time is preferably from 0.5 to 5 hours.

The ethylene oxide addition polymerization to the compound (9) having a hydroxyl group newly formed by the deprotection of the cyclic acetal structure is not particularly limited but preferably, production can be conducted via the following step (C1) and subsequently the step (C2).

Step (C1): A Step of Dissolving the Compound (9) in an Aqueous Solution Containing Preferably from 50 Mol % to 250 Mol % of an Alkali Catalyst to the Compound, then Adding an Organic Solvent, and Conducting Azeotropic Dehydration at Preferably from 50 to 130° C.

Step (C2): A Step of Reacting Ethylene Oxide to the Compound (9) at 50 to 130° C. in the Presence of an Organic Solvent to Obtain the Compound (4)

The alkali catalyst in the step (C1) is not particularly limited but there may be mentioned metal sodium, metal potassium, sodium hydride, potassium hydride, sodium hydroxide, potassium hydroxide, sodium methoxide, potassium methoxide, and the like. As the solvent for dissolving the alkali catalyst, a protic polar solvent such as methanol or ethanol can be used in addition to water. The concentration of the alkali catalyst is preferably from 50 mol % to 250 mol % relative to the compound (9). When it is less than 50% by mol, the polymerization reaction rate of ethylene oxide is decreased and thermal history is increased to form impurities such as terminal vinyl ether bodies and the like, so that it is advantageous to control the concentration to 50 mol % or more for producing a high-quality high-molecular-weight polymer. When the catalyst exceeds 250 mol %, viscosity of the reaction solution is increased or the solution is solidified at the alcoholate formation reaction, so that the stirring efficiency is decreased and there is a tendency that the alcoholate formation is not promoted.

The organic solvent for the azeotropic dehydration is not particularly limited so long as it is an aprotic solvent such as toluene, benzene, xylene, acetonitrile, ethyl acetate, tetrahydrofuran, chloroform, methylene chloride, dimethyl sulfoxide, dimethylformamide, or dimethylacetamide but toluene having a boiling point close to that of water is preferred. Azeotropic temperature is preferably from 50 to 130° C. When the temperature is lower than 50° C., viscosity of the reaction solution is increased and moisture tends to remain. Since the remaining of moisture forms a polyethylene glycol compound derived from the moisture, molecular weight distribution is broadened and there is a concern that the quality is lowered. Also, when the temperature is higher than 130° C., there is a concern that a condensation reaction occurs. In the case that the moisture remains, it is preferred to repeat the azeotropic dehydration repeatedly.

The step (C2) is conducted in an organic solvent. The reaction solvent is not particularly limited so long as it is an aprotic solvent such as toluene, benzene, xylene, acetonitrile, ethyl acetate, tetrahydrofuran, chloroform, methylene chloride, dimethyl sulfoxide, dimethylformamide, or dimethylacetamide but toluene easily removable by crystallization and vacuum drying after the reaction is preferred. Reaction time is preferably from 1 to 24 hours. When the time is shorter than 1 hour, there is a concern that the catalyst is not completely dissolved. When the time is longer than 24 hours, there is a concern that the aforementioned decomposition reaction occurs.

Reaction temperature is preferably from 50 to 130° C. When the temperature is lower than 50° C., the rate of the polymerization reaction is low and the thermal history is increased, so that the quality of the compound (4) tends to be lowered. Moreover, when the temperature is higher than 130° C., side reactions such as vinyl etherification of the terminal end occur during the polymerization and the compound (4) tends to be lowered. During the polymerization, since the viscosity of the reaction solution is increased as the molecular weight is increased, an aprotic solvent, preferably toluene may be appropriately added.

The step (C2) may be repeated plural times. In that case, the reaction may be conducted in the same manner as above-described conditions with adding ethylene oxide to the reaction mixture that remains in the reaction vessel. By controlling the number of repetitions, the average addition molar number n can be controlled.

With regard to the compound (4) of the invention, polydispersity Mw/Mn from the starting point of elution until the final point of elution satisfies the relationship of Mw/Mn≤1.05 when gel permeation chromatography is conducted. More preferred is the case where it satisfies Mw/Mn≤1.03.

Also, with regard to the compound of the formula (1) of the invention to be synthesized using the compound of the formula (4) as an intermediate, polydispersity Mw/Mn from the starting point of elution until the final point of elution satisfies the relationship of Mw/Mn≤1.05 when gel permeation chromatography is conducted. More preferred is the case where it satisfies Mw/Mn≤1.03.

In the case of Mw/Mn>1.05, a polyethylene glycol different in the number of arms is contained and/or ethylene oxide addition does not homogeneously take place, so that the case means that the product is a compound having a broad molecular weight distribution. In the case of binding it to a bio-related substance, since the number of modifications with the bio-related substance in one molecule of polyethylene glycol is different, and in the case of using it as a raw material of a carrier for drug controlled release or a hydrogel of a regeneration medicine material, since strict control of permeation and/or diffusion rate of a substance becomes difficult, there is a concern that a side effect is caused as a pharmaceutical and a biomaterial.

The following describe the introduction of reactive groups into the hydroxyl groups of the compound (4) in detail. In the following description, the compounds (1) in which functional groups Z are (a) to (p) are sometimes designated as a (a) body to a (p) body, respectively or an "amine body (f)" and the like with attaching the name of the functional group.

[Production Method of the Compound (1) in which Z is (d) or (m)]

A p-nitrophenyl carbonate body (d) or a sulfonate body (m) can be obtained by reacting an organic base such as triethylamine, pyridine, or 4-dimethylaminopyridine or an inorganic base such as sodium carbonate, sodium hydroxide, sodium hydrogen carbonate, sodium acetate, potassium carbonate, or potassium hydroxide with any of the compounds represented by the following general formulae (d1) and (m1) in an aprotic solvent such as toluene, benzene, xylene, acetonitrile, ethyl acetate, diethyl ether, t-butyl methyl ether, tetrahydrofuran, chloroform, methylene chloride, dimethyl sulfoxide, dimethylformamide, or dimethylacetamide or in no solvent. Also, the above organic base or inorganic base may not be used. The use ratio of the organic base or inorganic base is not particularly limited but is preferably molar equivalent or more to the hydroxyl group in the compound (4). Moreover, an organic base may be used as a solvent. W in (d1) or (m1) is a halogen atom selected from chlorine, bromine, and iodine and is preferably chlorine. The use ratio of the compound represented by the general formula (d1) or (m1) is not particularly limited but is preferably molar equivalent or more to the hydroxyl group in the compound (4), and further preferably, it is preferred to react them in the range of molar equivalent to 50 moles. Reaction temperature is preferably from 0 to 300° C., further preferably from 20 to 150° C. Reaction time is preferably from 10 minutes to 48 hours, further preferably from 30 minutes to 24 hours. The formed compound may be purified by a purification method such as extraction, recrystallization, adsorption treatment, reprecipitation, column chromatography, or supercritical extraction.

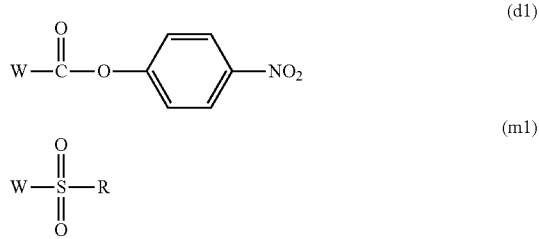

wherein W represents a halogen atom selected from chlorine, bromine, and iodine; and R represents a hydrocarbon group having 1 to 10 carbon atoms, which may contain a fluorine atom.

[Production Method of the Compound (1) in which Z is (o)]

A divinyl sulfone body (o) can be obtained by reacting the compound (4) with divinyl sulfone in an aprotic solvent such as toluene in the presence of a base catalyst. The base catalyst may be either an inorganic base or an organic base and is not particularly limited and examples thereof include potassium t-butoxide, sodium hydride, potassium hydride, metal sodium, hexamethyldisilazane, potassium carbonate, and the like. The use ratio of the base catalyst is not particularly limited but is preferably used in the range of 0.1 to 50 moles relative to the hydroxyl group of the compound (4). The use ratio of divinyl sulfone is not particularly limited but is preferably molar equivalent or more to the hydroxyl group of the compound (4) and, for preventing formation of a by-product dimmer, it is preferred to use it an excess amount of 10 equivalents or more. Reaction temperature is preferably from 0 to 100° C., further preferably from 20 to 40° C. Reaction time is preferably from 10 minutes to 48 hours, further preferably from 30 minutes to 24 hours. The formed compound may be purified by a purification method such as extraction, recrystallization, adsorption treatment, reprecipitation, column chromatography, or supercritical extraction.

[Production Method of the Compound (1) in which Z is (a)]

A carboxyl body (a) can be obtained by reacting the compound (4) or an amine body (f) to be mentioned below with a dicarboxylic acid anhydride such as succinic anhydride or glutaric anhydride in an aforementioned aprotic solvent or no solvent. The use ratio of the dicarboxylic acid anhydride is not particularly limited but is preferably molar equivalent or more, further preferably molar equivalent to 5 moles to the hydroxyl group of the compound (4). Reaction temperature is preferably from 0 to 200° C., further preferably from 20 to 150° C. Reaction time is preferably from 10 minutes to 48 hours, further preferably from 30 minutes to 12 hours.

For the reaction, there may be used an organic base such as triethylamine, pyridine, or dimethylaminopyridine or an inorganic base such as sodium carbonate, sodium hydroxide, sodium hydrogen carbonate, sodium acetate, potassium carbonate, or potassium hydroxide as a catalyst. The use ratio of the catalyst is not particularly limited but is preferably from 0.1 to 50% by mass, further preferably from 0.5 to 20% by mass relative to the compound (4). The thus formed compound may be purified by a purification method such as extraction, recrystallization, adsorption treatment, reprecipitation, column chromatography, or supercritical extraction or, in the case of using the compound as a raw material of a condensation reaction, it may be used as it is.

Also, the carboxyl body (a) can be obtained by reacting the compound (4) with a halogen-substituted carboxylic acid ester such as ethyl 6-bromohexanoate or ethyl 7-bromoheptanoate in an aforementioned aprotic solvent or no solvent. The use ratio of the halogen-substituted carboxylic acid ester is not particularly limited but is preferably molar equivalent or more, further preferably molar equivalent to 30 moles to the hydroxyl group of the compound (4). Reaction temperature is preferably from 0 to 200° C., further preferably from 20 to 150° C. Reaction time is preferably from 10 minutes to 48 hours, further preferably from 30 minutes to 12 hours. For the reaction, there may be used an organic base such as triethylamine, pyridine, or dimethylaminopyridine or an inorganic base such as sodium carbonate, sodium hydroxide, sodium hydrogen carbonate, sodium acetate, potassium carbonate, or potassium hydroxide as a catalyst. The use ratio of the catalyst is preferably from 0.1 to 500% by mass, further preferably from 0.5 to 300% by mass relative to the compound (4). After etherification, hydrolysis of an ester is conducted by adding an aqueous solution of sodium hydroxide, potassium hydroxide, or the like in case of the organic base or water in case of the inorganic base. Reaction temperature is preferably from 0 to 100° C., further preferably from 20 to 100° C. Reaction time is preferably from 10 minutes to 48 hours, further preferably from 30 minutes to 12 hours. After the reaction, neutralization is conducted with hydrochloric acid, sulfuric acid, or the like. The thus formed compound may be purified by an aforementioned purification method or, in the case of using the compound as a raw material of a condensation reaction, it may be used as it is.

[Production Method of the Compound (1) in which Z is (b)]

A succinimide body (b) can be obtained by subjecting the carboxyl body (a) to a condensation reaction with N-hydroxysuccinimide in an aforementioned aprotic solvent or no solvent in the presence of a condensing reagent such as DCC or EDC. The condensing agent is not particularly limited but is preferably DCC. The use ratio of DCC is preferably molar equivalent or more, further preferably molar equivalent to 5 moles to the carboxyl group. The use ratio of N-hydroxysuccinimide is preferably molar equivalent or more, further preferably molar equivalent to 5 moles to the carboxyl group. Reaction temperature is preferably from 0 to 100° C., further preferably from 20 to 80° C. Reaction time is preferably from 10 minutes to 48 hours, further preferably from 30 minutes to 12 hours. The formed compound may be purified by a purification method such as extraction, recrystallization, adsorption treatment, reprecipitation, column chromatography, or supercritical extraction.

[Production Method of the Compound (1) in which Z is (c)]

A succinimide carbonate body (c) can be obtained by reacting the compound (4) with an organic base such as triethylamine, pyridine, or 4-dimethylaminopyridine or an inorganic base such as sodium carbonate, sodium hydroxide, sodium hydrogen carbonate, sodium acetate, potassium carbonate, or potassium hydroxide and N,N'-disuccinimide carbonate in an aforementioned aprotic solvent or in no solvent. The above-described organic base or inorganic base may not be used. The use ratio of the organic base or inorganic base is not particularly limited but is preferably molar equivalent or more to the hydroxyl group of the compound (4). Moreover, the organic base may be used as a solvent. The use ratio of N,N'-disuccinimide carbonate is preferably molar equivalent or more, further preferably molar equivalent to 5 moles to the hydroxyl group of the compound (4). Reaction temperature is preferably from 0 to 100° C., further preferably from 20 to 80° C. Reaction time is preferably from 10 minutes to 48 hours, further preferably from 30 minutes to 12 hours. The formed compound may be purified by a purification method such as extraction, recrystallization, adsorption treatment, reprecipitation, column chromatography, or supercritical extraction.

[Production Method of the Compound (1) in which Z is (f)]

The amine body (f) can be obtained by adding the compound (4) to acrylonitrile or the like using an inorganic base such as sodium hydroxide or potassium hydroxide as a catalyst in a solvent such as water or acetonitrile to obtain a nitrile body and thereafter conducting a hydrogenation reaction of the nitrile group under a nickel or palladium catalyst in an autoclave. The use ratio of the inorganic base at the time of obtaining the nitrile body is not particularly limited but is preferably from 0.01 to 50% by mass relative to the compound (4). The use ratio of acrylonitrile is not particularly limited but is preferably molar equivalent or more, further preferably molar equivalent to 50 moles to the hydroxyl group of the compound (4). Moreover, acrylonitrile may be used as a solvent. Reaction temperature is preferably from −50 to 100° C., further preferably from −20 to 60° C. Reaction time is preferably from 10 minutes to 48 hours, further preferably from 30 minutes to 24 hours. The reaction solvent in the subsequent hydrogenation reaction of the nitrile body is not particularly limited so long as it is a solvent that does not participate in the reaction but is preferably toluene. The use ratio of the nickel or palladium catalyst is not particularly limited but is from 0.05 to 30% by mass, preferably from 0.5 to 20% by mass relative to the nitrile body. Reaction temperature is preferably from 20 to 200° C., further preferably from 50 to 150° C. Reaction time is preferably from 10 minutes to 48 hours, further preferably from 30 minutes to 24 hours. Hydrogen pressure is preferably from 2 to 10 MPa, further preferably from 3 to 8 MPa. Moreover, in order to prevent dimerization, ammonia may be added into the reaction system. Ammonia pressure in the case of adding ammonia is not particularly limited but is from 0.1 to 10 MPa, further preferably from 0.3 to 2 MPa. The formed compound may be purified by a purification method such as extraction, recrystallization, adsorption treatment, reprecipitation, column chromatography, or supercritical extraction.

Alternatively, the amine body (f) can be also obtained by reacting the sulfonate body (m) with aqueous ammonia. The reaction is carried out in aqueous ammonia and the concentration of ammonia is not particularly limited but is preferably in the range of 10 to 40% by mass. The use ratio of aqueous ammonia is preferably from 1 to 300 times relative to the mass of the sulfonate body (m). Reaction temperature is preferably from 0 to 100° C., further preferably from 20 to 80° C. Reaction time is preferably from 10 minutes to 72 hours, further preferably from 1 to 36 hours.

Moreover, the amine body (f) can be obtained by reacting the sulfonate body (m) with ammonia in an autoclave. The reaction solvent is not particularly limited but methanol and ethanol may be preferably mentioned. The amount of ammonia is preferably from 10 to 300% by mass, further preferably from 20 to 200% by mass relative to the sulfonate body (m). Reaction temperature is preferably from 50 to 200° C., further preferably from 80 to 150° C. Reaction time is preferably from 10 minutes to 24 hours, further preferably from 30 minutes to 12 hours. The formed compound may be purified by the aforementioned purification method.

Furthermore, the amine body (f) can be also obtained by combining the compound (4) with phthalimide using the Mitsunobu reaction in an aprotic solvent, followed by deprotection with a primary amine. The reaction conditions for the Mitsunobu reaction are not particularly limited but the reaction solvent is preferably chloroform or dichloromethane. The use ratio of triphenylphosphine and an azocarboxylic acid ester is not particularly limited but is preferably molar equivalent or more, further preferably molar equivalent to 50 moles to the hydroxyl group of the compound (4). Reaction temperature is preferably from 0 to 100° C., further preferably from 10 to 50° C. Reaction time is preferably from 10 minutes to 72 hours, further preferably from 30 minutes to 6 hours.

With regard to the deprotection, the primary amine to be used is not particularly limited but there may be preferably mentioned ammonia, methylamine, ethylamine, propylamine, butylamine, pentylamine, hexylamine, cyclohexylamine, ethanolamine, propanolamine, butanolamine, ethylenediamine, and the like. As a matter of course, these primary amines may be used as solvents. The use ratio of the primary amine is not particularly limited but is preferably molar equivalent or more, further preferably molar equivalent to 500 moles to the hydroxyl group of the compound (4). The reaction solvent is not particularly limited but methanol is preferred. Reaction temperature is preferably from 0 to 100° C., further preferably from 20 to 80° C. Reaction time is preferably from 10 minutes to 72 hours, further preferably from 1 to 10 hours. The formed compound may be purified by the aforementioned purification method.

[Production Method of the Compound (1) in which Z is (g)]

An oxyamine body (g) can be obtained by reacting the active carbonate body (c) or (d) with a compound (g1) represented by the following general formula in the presence of a base catalyst such as triethylemine or pyridine to convert the carbonate body into an oxyphthalimide body, followed by dephthalimidation in the presence of a primary amine. The reaction solvent for the oxyphthalimidation is not particularly limited so long as it is no solvent or a polar solvent but is preferably dimethylformamide. The use ratio of the base catalyst is not particularly limited but is preferably molar equivalent or more, further preferably in the range of molar equivalent to 20 moles to the active carbonate group. The use ratio of compound (g1) is preferably molar equivalent or more, further preferably molar equivalent to 20 moles to the active carbonate group. Reaction temperature is preferably from 0 to 100° C., further preferably from 20 to 80° C. Reaction time is preferably from 10 minutes to 48 hours, further preferably from 30 minutes to 12 hours. The formed compound may be purified by a purification method such as extraction, recrystallization, adsorption treatment, reprecipitation, column chromatography, or supercritical extraction or may be used in the following step without purification.

The reaction solvent for the dephthalimidation is not particularly limited but methanol is preferred. The primary amine to be used is not particularly limited but there may be preferably mentioned ammonia, methylamine, ethylamine, propylamine, butylamine, pentylamine, hexylamine, cyclohexylamine, ethanolamine, propanolamine, butanolamine, ethylenediamine, and the like. As a matter of course, these primary amines may be used as solvents. The use ratio of the primary amine is not particularly limited but is preferably molar equivalent or more, further preferably molar equivalent to 50 moles to the active carbonate group. Reaction temperature is preferably from 0 to 100° C., further preferably from 20 to 80° C. Reaction time is preferably from 10 minutes to 48 hours, further preferably from 30 minutes to 12 hours. The formed compound may be purified by the aforementioned purification method.

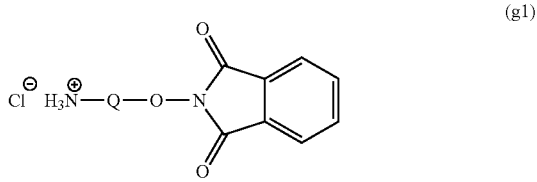

(Q represents a linear alkylene group having 1 to 7 carbon atoms.)

[Production Method of the Compound (1) in which Z is (n)]

A maleimide body (n) can be obtained by reacting the amine body (f) with maleic anhydride in an aforementioned aprotic solvent or no solvent to obtain a maleamide body and then subjecting it to a ring-closing reaction using acetic anhydride or sodium acetate as catalysts. The use ratio of maleic anhydride in the maleamidation reaction is not particularly limited but is preferably molar equivalent or more, further preferably molar equivalent to 5 moles to the amino group. Reaction temperature is preferably from 0 to 200° C., further preferably from 20 to 120° C. Reaction time is preferably from 10 minutes to 48 hours, further preferably from 30 minutes to 12 hours. The formed compound may be purified by a purification method such as extraction, recrystallization, adsorption treatment, reprecipitation, column chromatography, or supercritical extraction or may be used in the following step without purification.

The reaction solvent for the subsequent ring-closing reaction is not particularly limited but an aprotic solvent or acetic anhydride is preferred. The use ratio of sodium acetate is not particularly limited but is preferably molar equivalent or more, further preferably molar equivalent to 50 moles to the maleamide group. Reaction temperature is preferably from 0 to 200° C., further preferably from 20 to 150° C. Reaction time is preferably from 10 minutes to 48 hours, further preferably from 30 minutes to 12 hours. The formed compound may be purified by the aforementioned purification method.

Moreover, the maleimide body (n) can be also obtained by reacting a compound (n1) represented by the following general formula with the amine body (f) in an aforementioned aprotic solvent or no solvent. The use ratio of (n1) is preferably molar equivalent or more, further preferably molar equivalent to 5 moles to the amino group (f). Reaction temperature is preferably from 0 to 200° C., further preferably from 20 to 80° C. Reaction time is preferably from 10 minutes to 48 hours, further preferably from 30 minutes to 12 hours. Light may be shielded at the time of the reaction. The formed compound may be purified by the aforementioned purification method.

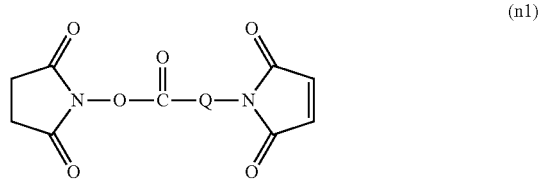

(Q represents a linear alkylene group having 1 to 7 carbon atoms.)

[Production Method of the Compound (1) in which Z is (e)]

An aldehyde body (e) can be obtained by reacting the sulfonate body (m) with a compound (e1) represented by the following general formula in an aforementioned aprotic solvent or in no solvent to obtain an acetal body and then subjecting it to hydrolysis under acidic conditions. The use ratio of (e1) is preferably molar equivalent or more, further preferably molar equivalent to 50 moles to the sulfonate group. (e1) can be prepared from a corresponding alcohol using metal sodium, metal potassium, sodium hydride, potassium hydride, sodium methoxide, potassium t-butoxide, or the like. Reaction temperature is preferably from 0 to 300° C., further preferably from 20 to 150° C. Reaction time is preferably from 10 minutes to 48 hours, further preferably from 30 minutes to 24 hours.

Moreover, in the case of using the compound (e2), the acetal body can be obtained by converting the hydroxyl group of the compound (4) into an alcoholate by the aforementioned method and subsequently conducting a reaction using (e2) in a ratio of molar equivalent or more, preferably molar equivalent to 100 moles to the hydroxyl group of the compound (4) in an aprotic solvent or in no solvent. Reaction temperature is preferably from 0 to 300° C., further preferably from 20 to 150° C. Reaction time is preferably from 10 minutes to 48 hours, further preferably from 30 minutes to 24 hours.

Furthermore, in the case of using the compound (e3), the acetal body can be obtained by reacting the carboxyl body (a), the succinimide body (b), or the active carbonate body (c), (d), and (e3). In the reaction with (e3), the solvent is not particularly limited but the reaction is preferably conducted in an aprotic solvent. The use ratio of (e3) is preferably molar equivalent or more, further preferably molar equivalent to 10 moles to the carboxyl group, the succinimide group, or the active carbonate group. Reaction temperature is preferably from −30 to 200° C., further preferably from 0 to 150° C. Reaction time is preferably from 10 minutes to 48 hours, further preferably from 30 minutes to 24 hours. In the case of using the carboxyl body (a), a condensing agent such as DCC or EDC may be appropriately used. The formed compound may be purified by a purification method such as extraction, recrystallization, adsorption treatment, reprecipitation, column chromatography, or supercritical extraction or may be used in the following step without purification.

The subsequent aldehyde formation reaction can be achieved by transforming the acetal body into a 0.1 to 50% aqueous solution and hydrolyzing it in an aqueous solution which is adjusted to pH 1 to 4 with an acid such as acetic acid, phosphoric acid, sulfuric acid, or hydrochloric acid. Reaction temperature is preferably from −20 to 100° C., further preferably from 0 to 80° C. Reaction time is preferably from 10 minutes to 24 hours, further preferably from 30 minutes to 10 hours. The reaction may be conducted with shielding light. The formed compound may be purified by the aforementioned purification method.

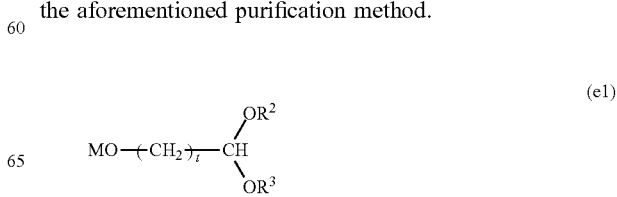

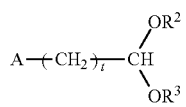

(e2)

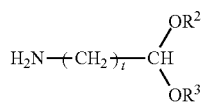

(e3)

wherein $R^2$ and $R^3$ are each a hydrocarbon group having 1 to 3 carbon atoms and may be the same or different from each other, and they may form a ring each other; M is sodium or potassium; A is a halogen atom selected from chlorine, bromine, and iodine or a sulfone-based protective group; and t is an integer of 1 to 12.

[Production Method of the Compound (1) in which Z is (k)]

A mercapto body (k) can be obtained by reacting the sulfonate body (m) with a thiation agent such as thiourea to form a thiazolium salt and then subjecting it to hydrolysis under alkaline conditions. The thiation reaction is conducted in acetonitrile or an alcohol solvent such as methanol, ethanol, or 2-propanol or in no solvent. The use ratio of the thiation agent is preferably molar equivalent or more, further preferably in the range of molar equivalent to 50 moles to the sulfonate group. Reaction temperature is preferably from 0 to 300° C., further preferably from 20 to 150° C. Reaction time is preferably from 10 minutes to 48 hours, further preferably from 30 minutes to 24 hours. The subsequent hydrolysis can be achieved by forming a 0.1 to 50% aqueous solution of the thiazolium salt body and hydrolyzing it in an aqueous solution which is adjusted to pH 10 to 14 with an alkali such as sodium hydroxide, potassium hydroxide, or potassium carbonate. Reaction temperature is preferably from −20 to 100° C., further preferably from 0 to 80° C. Reaction time is preferably from 10 minutes to 24 hours, further preferably from 30 minutes to 10 hours. The reaction may be conducted with shielding light. The formed compound may be purified by a purification method such as extraction, recrystallization, adsorption treatment, reprecipitation, column chromatography or supercritical extraction.

Moreover, the mercapto body (k) may be also obtained by reacting the sulfonate body (m) with a compound (k1) represented by the following general formula in an aforementioned aprotic solvent or in no solvent, followed by decomposition with a primary amine. The use ratio of (k1) is preferably molar equivalent or more, further preferably in the range of molar equivalent to 50 moles to the sulfonate group. Reaction temperature is preferably from 0 to 300° C., further preferably from 20 to 80° C. Reaction time is preferably from 10 minutes to 48 hours, further preferably from 30 minutes to 24 hours. The subsequent alkali decomposition with a primary amine is conducted in an aprotic solvent or in no solvent. The primary amine to be used is not particularly limited but there may be preferably mentioned ammonia, methylamine, ethylamine, propylamine, butylamine, pentylamine, hexylamine, cyclohexylamine, ethanolamine, propanolamine, butanolamine, ethylenediamine, and the like. As a matter of course, these primary amines may be used as solvents. The formed compound may be purified by the aforementioned purification method.

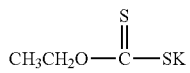

(k1)

[Production Method of the Compound (1) in which Z is (l)]

A dipyridyl disulfide body (l) can be obtained by reacting the mercapto body (k) with 2,2-dipyridyl disulfide. The reaction solvent is not particularly limited but the reaction is preferably conducted in an alcohol solvent such as methanol, ethanol, or 2-propanol. The use ratio of 2,2-dipyridyl disulfide is preferably molar equivalent or more, further preferably molar equivalent to 50 moles to the mercapto group. Reaction temperature is preferably from −30 to 100° C., further preferably from 0 to 60° C. Reaction time is preferably from 10 minutes to 48 hours, further preferably from 30 minutes to 24 hours. The formed compound may be purified by a purification method such as extraction, recrystallization, adsorption treatment, reprecipitation, column chromatography, or supercritical extraction.

[Production Method of the Compound (1) in which Z is (p)]

An iodoacetyl body (p) can be obtained by reacting the amino body (f) with iodoacetic anhydride in an aforementioned aprotic solvent or no solvent. The use ratio of iodoacetic anhydride is not particularly limited but is preferably molar equivalent or more, further preferably molar equivalent to 5 moles to the amino group. Reaction temperature is preferably from 0 to 200° C., further preferably from 20 to 120° C. Reaction time is preferably from 10 minutes to 48 hours, further preferably from 30 minutes to 12 hours. The formed compound may be purified by a purification method such as extraction, recrystallization, adsorption treatment, reprecipitation, column chromatography, or supercritical extraction.

Moreover, the iodoacetyl body (p) can be also obtained by reacting the amino body (f) with iodoacetic acid in the presence of a condensing agent such as DCC or EDC in an aforementioned aprotic solvent or in no solvent. The condensing agent is not particularly limited but is preferably DCC. The use ratio of DCC is preferably molar equivalent or more, further preferably molar equivalent to 5 moles to the amino group. The use ratio of iodoacetic acid is not particularly limited but is preferably molar equivalent or more, further preferably molar equivalent to 5 moles to the amino group. Reaction temperature is preferably from 0 to 100° C., further preferably from 20 to 80° C. Reaction time is preferably from 10 minutes to 48 hours, further preferably from 30 minutes to 12 hours. The formed compound may be purified by the aforementioned purification method.

[Production Method of the Compound (1) in which Z is (h)]

A hydrazide body (h) can be obtained by reacting the succinimide body (b) or the active carbonate body (c), (d) body with t-butyl carbazate in an aforementioned aprotic solvent or no solvent, followed by deprotection of t-butylcarbonyl group. The use ratio of t-butyl carbazate is not particularly limited but is preferably molar equivalent or more, further preferably molar equivalent to 10 moles to the succinimide group or the active carbonate group. Reaction temperature is preferably from 0 to 200° C., further preferably from 20 to 80° C. Reaction time is preferably from 10 minutes to 48 hours, further preferably from 30 minutes to 12 hours. The formed compound may be purified by a purification method such as extraction, recrystallization, adsorption treatment, reprecipitation, column chromatography, or supercritical extraction.

[Production Method of the Compound (1) in which Z is (j)]

An acetylene body (j) can be obtained by reacting the succinimide body (b) or the active carbonate body (c), (d) body with a compound (j1) represented by the following general formula in an aforementioned aprotic solvent or no solvent. The use ratio of (j1) is not particularly limited but is preferably molar equivalent or more, further preferably molar equivalent to 50 moles of (j1) to the succinimide group or the active carbonate group. Reaction temperature is preferably from 0 to 300° C., further preferably from 20 to 150° C. Reaction time is preferably from 10 minutes to 48 hours, further preferably from 30 minutes to 24 hours. The formed compound may be purified by a purification method such as extraction, recrystallization, adsorption treatment, reprecipitation, column chromatography, or supercritical extraction.

(j1)

wherein u is an integer of 1 to 5; and $R^4$ represents a hydrogen atom or a hydrocarbon group having 1 to 5 carbon atoms.

[Production Method of the Compound (1) in which Z is (i)]

An azide body (i) can be obtained by reacting the sulfonate body (m) with sodium azide in an aforementioned aprotic solvent or in no solvent. The use ratio of sodium azide is preferably molar equivalent or more, further preferably molar equivalent to moles of the sulfonate group. Reaction temperature is preferably from 0 to 300° C., further preferably from 20 to 150° C. Reaction time is preferably from 10 minutes to 48 hours, further preferably from 30 minutes to 24 hours. The formed compound may be purified by a purification method such as extraction, recrystallization, adsorption treatment, reprecipitation, column chromatography, or supercritical extraction.

EXAMPLES

The following further specifically describe the invention based on Examples but the invention should not be construed as being limited thereto. Incidentally, $^1$H-NMR was used for identification of compounds in the examples, GPC was used for the molecular weight distribution, and the molecular weight was determined by measuring TOF-MS or a hydroxyl value.

<Analytical Method on $^1$H-NMR>

For $^1$H-NMR analysis, JNM-ECP400 and JNM-ECP600 manufactured by JOEL Ltd. were used. Integrated values in NMR measurement values are theoretical values.

<Analytical Method on GPC>

For GPC analysis, measurement was conducted with a system using any of DMF, THF, or water as an eluent. Measurement conditions for each system are shown below.

DMF system . . . GPC system: SHIMADZU LC-10Avp, Eluent: DMF, Flow rate: 0.7 ml/min, Column: PL gel MIXED-D×2 (Polymer Laboratory), Column temperature: 65° C., Detector: RI, Sample amount: 1 mg/g, 100 μl THF system . . . GPC system: SHODEX GPC STSTEM-11, Eluent: THF, Flow rate: 1 ml/min, Column: SHODEX KF-801, KF-803, KF-804 (I.D. 8 mm×30 cm), Column temperature: 40° C., Detector: RI, Sample amount: 1 mg/g, 100 μl Water system . . . GPC system: alliance (Waters), Eluent: 100 mM sodium acetate, 0.02% $NaN_3$ buffer solution (pH 5.2), Flow rate: 0.5 ml/min, Column: ultrahydrogel 500+ ultrahydrogel 250 (Waters), Column temperature: 30° C., Detector: RI, Sample amount: 5 mg/g, 20 μl The GPC measurement value is an analysis value at a main peak with removing high-molecular-weight impurities and low-molecular-weight impurities by vertically cutting the baseline from inflection points of an elution curve. Fraction % represents a ratio of the main peak relative to the whole peak from the elution start point to the elution final point, $M_n$ represents number-average molecular weight, $M_w$ represents weight-average molecular weight, $M_p$ represents peak top molecular weight, and Mw/Mn represents polydispersity.

<Molecular Weight Measurement on TOF-MS>

Measurement was conducted using TOF-MS (manufactured by Bruker, autoflex III) using Dithranol as a matrix and sodium trifluoroacetate as a salt. For analysis, FlexAnalysis was used and analysis of molecular weight distribution was conducted on Polytools. The obtained value at gravity center was described as a value of molecular weight.

<Molecular Weight Measurement by Hydroxyl Value Measurement>

According to JIS K1557-1, the hydroxyl value was measured by A method (acetic anhydride/pyridine). The molecular weight was calculated from the measured hydroxyl value according to the following equation.

(Molecular Weight)=56.1×1,000×8/(Hydroxyl Value)

Incidentally, in the case of a polyethylene glycol derivative, the value is a theoretical value calculated from the molecular weight of a hydroxyl body that is an intermediate.

Example 1

Synthesis of Compounds (I), (II), (III), and (IV)
(Cases where L=n-Butylene Group, k=1, Molecular Weight: About 5,000, 10,000, 20,000, 40,000)

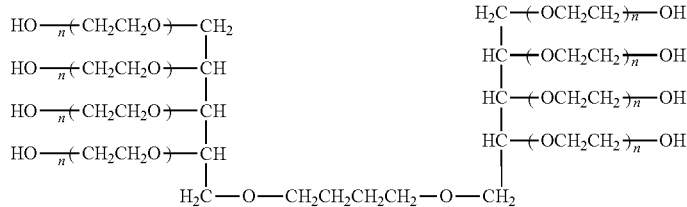

n ≈ 13: (I), n ≈ 27: (II), n ≈ 55: (III), n ≈ 112: (IV)

Example 1-1

After 130.3 g (0.56 mol) of 1,2,3,4-diisopropylidenexylitol and 1,650 g of dehydrated toluene were added to a 5,000 ml round-bottom flask fitted with a thermometer, a nitrogen-inlet tube, and a stirrer and are dissolved each other under a nitrogen atmosphere, 65.4 g (0.58 mol) of potassium t-butoxide was added thereto, followed by stirring at room temperature for 30 minutes. On the other hand, 55.2 g (0.22 mol) of 1,4-butanediol dimethanesulfonate was dissolved in 660 g of dehydrated DMF and then the solution was added dropwise into the reaction solution at 40° C. or lower over a period of 30 minutes. After completion of the stepwise addition, the temperature was raised to 50° C. and the reaction was conducted for 6 hours. After completion of the reaction, the reaction solution was cooled and, after 1,100 g of ion-exchanged water was added and the whole was stirred for 20 minutes, the whole was allowed to stand and the aqueous layer was removed. A water-washing operation of adding 830 g of ion-exchanged water and allowing the whole to stand after stirring was repeated eight times to remove DMF and unreacted raw materials. After the water-washing, the organic layer was concentrated and dried with adding 27.6 g of magnesium sulfate, followed by filtration. The filtrate was again concentrated and purified by silica gel column chromatography (Wakogel C-200, Eluent: ethyl acetate:hexane=10:3 (v/v)) to obtain 76.9 g of 1,1'-butylene-bis(2,3,4,5-diisopropylidenexylitol) (V) (0.15 mol; yield: 66%).

$^1$H-NMR (CDCl$_3$, internal standard: TMS)

δ (ppm):

1.39, 1.41, 1.42, 1.44 (24H, s, —O—C—C$\underline{H}_3$), 1.65 (4H, quint, —OCH$_2$C$\underline{H}_2$CH$_2$CH$_2$—O—), 3.49 (4H, m, —OCH$_2$CH$_2$CH$_2$C$\underline{H}_2$—O—), 3.54-3.58 (4H, m, —C$\underline{H}_2$—O—), 3.85 (2H, t, —C$\underline{H}$—O—), 3.89 (2H, dd, —C$\underline{H}$—O—), 4.02-4.07 (4H, m, —C$\underline{H}_2$—O—), 4.17 (2H, dd, —C$\underline{H}$—O—)

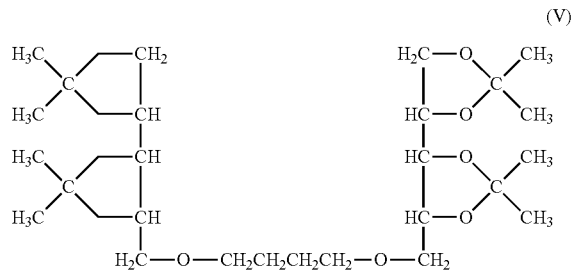

(V)

Example 1-2

After 76.8 g (0.15 mol) of 1,1'-butylene-bis(2,3,4,5-diisopropylidenexylitol) (V) obtained in Example 1-1, 456 g of methanol, and 45 g of ion-exchanged water were added to a 1,000 ml round-bottom flask fitted with a thermometer, a nitrogen-inlet tube, and a stirrer and are dissolved each other under a nitrogen atmosphere, 76.4 g of Dowex 50 W-8H (manufactured by Dow Chemical Company) dispersed in 76 g of methanol was added thereto and the whole was heated and refluxed to remove acetone produced as a by-product in an azeotropic manner. The reaction solution was filtrated and the filtrate was concentrated to obtain 53.6 g of 1,1'-butylene-bisxylitol (VI) having the following structure (yield: 66%). $^1$H-NMR (D$_2$O, internal standard: TMS)

δ (ppm):

1.66 (4H, quint, —OCH$_2$C$\underline{H}_2$C$\underline{H}_2$CH$_2$—O—), 3.56-3.75 (14H, m, —OC$\underline{H}_2$CH$_2$CH$_2$C$\underline{H}_2$—O—, —C$\underline{H}_2$—O—, —C$\underline{H}$—O—), 3.79-3.82 (2H, m, —C$\underline{H}$—O—), 3.91-3.93 (2H, m, —C$\underline{H}$—O—)

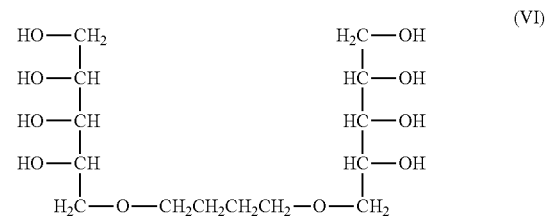

(VI)

Example 1-3: Case of Molecular Weight of 5,000

52 g of 1,1'-butylene-bisxylitol (VI) obtained in Example 1-2 was warmed and, while washing it with 34 g of methanol, was charged into a 5 L autoclave. Subsequently, 4.9 g of potassium hydroxide and 10 g of ion-exchanged water were added to a 50 ml beaker to prepare an aqueous potassium hydroxide solution, which was then charged into the 5 L autoclave. Then, 500 g of dehydrated toluene was added thereto and an azeotropic dehydration operation was repeated three times at 80° C., under slightly reduced pressure. After the azeotropic dehydration, 1,423 g of dehydrated toluene was added and, after the inside of the system was replaced by nitrogen, 654 g (14.85 mol) of ethylene oxide was added at 80 to 150° C. under a pressure of 1 MPa or less, followed by continuation of the reaction for another 1 hour. After the reaction, the whole was cooled to 60° C., 945 g of the reaction solution was taken out of the autoclave, and pH was adjusted to 7.5 with an 85% aqueous phosphoric acid solution to obtain the following compound (I). FIG. 1 is a GPC chart of the compound (I).

$^1$H-NMR (CDCl$_3$, internal standard: TMS)

δ (ppm):

1.57 (4H, br, —OCH$_2$C$\underline{H}_2$C$\underline{H}_2$CH$_2$—O—), 2.66 (8H, br, —O$\underline{H}$), 3.40 (4H, br, —OC$\underline{H}_2$CH$_2$CH$_2$C$\underline{H}_2$—O—), 3.50-3.81 (430H, m, —C$\underline{H}_2$O (C$\underline{H}_2$C$\underline{H}_2$O)$_n$H, C$\underline{H}$O(CH$_2$CH$_2$O)$_n$H, —C$\underline{H}_2$—OCH$_2$CH$_2$CH$_2$CH$_2$O—C$\underline{H}_2$—)

GPC analysis (THF system) . . . main fraction: 100%, Mn: 3,502, Mw: 3,556, Mw/Mn: 1.015, Mp: 3,631

Molecular weight (TOF-MS); 4,991

Molecular weight (hydroxyl value); 5,097

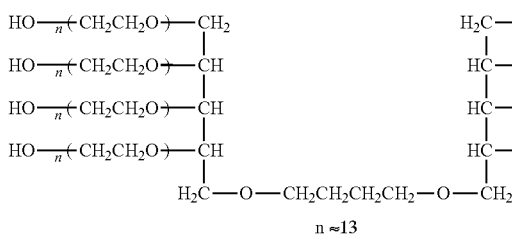 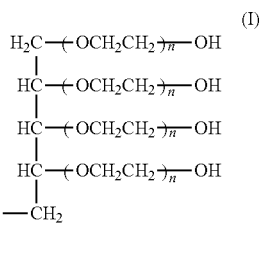

(I)

n ≈ 13

Example 1-4: Case of Molecular Weight of 10,000

To about 1,345 g of the reaction solution remaining in the reaction vessel in Example 1-3, 370 g (8.40 mol) of ethylene oxide was added at 80 to 150° C. under a pressure of 1 MPa or less, followed by continuation of the reaction for another 1 hour. After the reaction, the whole was cooled to 60° C., 1,045 g of the reaction solution was taken out of the vessel, pH was adjusted to 7.5 with an 85% aqueous phosphoric acid solution, and toluene was removed by distillation to obtain the following compound (II).

$^1$H-NMR (CDCl$_3$, internal standard: TMS)

δ (ppm):

1.57 (4H, br, —OCH$_2$CH$_2$CH$_2$CH$_2$—O—), 2.365 (8H, br, —OH), 3.40 (4H, s, —OCH$_2$CH$_2$CH$_2$CH$_2$—O—), 3.50-3.81 (878H, m, —CH$_2$O (CH$_2$CH$_2$O)$_n$H, CHO(CH$_2$CH$_2$O)$_n$H, —CH$_2$—OCH$_2$CH$_2$CH$_2$CH$_2$O—CH$_2$—)

GPC analysis (THF system) . . . main fraction: 99.7%, Mn: 6,846, Mw: 6,956, Mw/Mn: 1.016, M$_p$: 7,115

Molecular weight (TOF-MS); 10,033

Molecular weight (hydroxyl value); 10,158 oxide was added at 80 to 150° C. under a pressure of 1 MPa or less, followed by continuation of the reaction for another 1 hour. After the reaction, the whole was cooled to 60° C., 620 g of the reaction solution was taken out of the vessel, pH was adjusted to 7.5 with an 85% aqueous phosphoric acid solution, and toluene was removed by distillation to obtain the following compound (III).

$^1$H-NMR (CDCl$_3$, internal standard: TMS)

δ (ppm):

1.57 (4H, br, —OCH$_2$CH$_2$CH$_2$CH$_2$—O—), 2.57 (8H, br, —OH), 3.40 (4H, s, —OCH$_2$CH$_2$CH$_2$CH$_2$—O—), 3.50-3.81 (1774H, m, —CH$_2$O (CH$_2$CH$_2$O)$_n$H, CHO(CH$_2$CH$_2$O)$_n$H, —CH$_2$—OCH$_2$CH$_2$CH$_2$CH$_2$O—CH$_2$—)

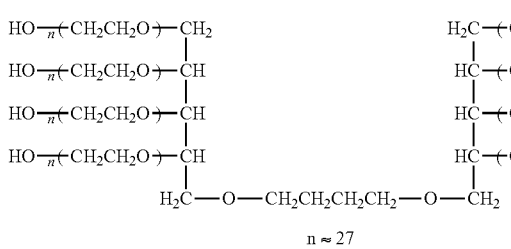 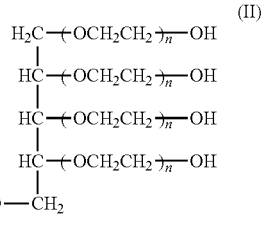

(II)

n ≈ 27

Example 1-5: Case of Molecular Weight of 20,000

To about 524 g of the reaction solution remaining in the reaction vessel in Example 1-4, 182 g (4.13 mol) of ethylene GPC analysis (THF system) . . . main fraction: 99.6%, Mn: 13,064, Mw: 13,245, Mw/Mn: 1.014, Mp: 13,589

Molecular weight (TOF-MS); 20,083

Molecular weight (hydroxyl value); 20,225

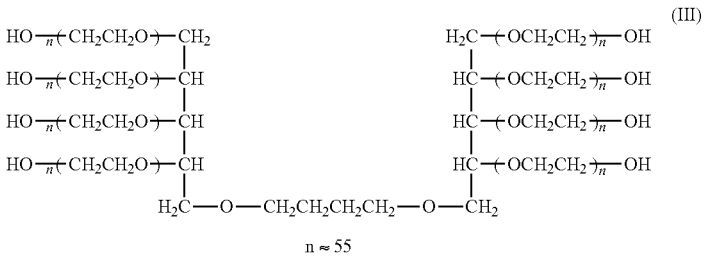

(III)

n ≈ 55

Example 1-6: Case of Molecular Weight of 40,000

To about 221 g of the reaction solution remaining in the reaction vessel in Example 1-5, 138 g (3.13 mol) of ethylene oxide was added at 80 to 150° C. under a pressure of 1 MPa or less, followed by continuation of the reaction for another 1 hour. After the reaction, the whole was cooled to 60° C., all the amount of the reaction solution was taken out of the vessel, pH was adjusted to 7.5 with an 85% aqueous phosphoric acid solution, and toluene was removed by distillation to obtain the following compound (IV).

$^1$H-NMR (CDCl$_3$, internal standard: TMS)
δ (ppm):
1.57 (4H, br, —OCH$_2$C$\underline{H}_2$C$\underline{H}_2$CH$_2$—O—), 2.589 (8H, br, —O$\underline{H}$), 3.40 (4H, s, —OC$\underline{H}_2$CH$_2$CH$_2$C$\underline{H}_2$—O—), 3.50-3.81 (3598H, m, —C$\underline{H}_2$O (C$\underline{H}_2$C$\underline{H}_2$O)$_n$H, C$\underline{H}$O(C$\underline{H}_2$C$\underline{H}_2$O)$_n$H, —C$\underline{H}_2$—OCH$_2$CH$_2$CH$_2$CH$_2$O—C$\underline{H}_2$—)

GPC analysis (THF system) ... main fraction: 97.3%, Mn: 24,050, Mw: 24,469, Mw/Mn: 1.017, Mp: 25,545
Molecular weight (TOF-MS); 41,450
Molecular weight (hydroxyl value); 38,590 mmol) of p-nitrophenyl chloroformate were added thereto, followed by reaction at 80° C. for 5 hours. After completion of the reaction, the reaction solution was filtrated and concentrated. After 60 g of ethyl acetate was added to the concentrated liquid at 40° C., 40 g of hexane was added thereto and the whole was stirred for 15 minutes. After it was allowed to stand, a separating organic layer was removed and ethyl acetate and hexane were again added, causing layer separation. The operation of removing low-molecular-weight impurities was repeated four times. Finally, the solvent was removed under reduced pressure to obtain the following p-nitrophenyl carbonate body (VII).

$^1$H-NMR (CDCl$_3$, internal standard: TMS)
δ (ppm):
1.57 (4H, br, —OCH$_2$C$\underline{H}_2$C$\underline{H}_2$CH$_2$—O—), 3.40 (4H, br, —OC$\underline{H}_2$CH$_2$CH$_2$C$\underline{H}_2$—O—), 3.50-3.81 (414H, m, —C$\underline{H}_2$O (C$\underline{H}_2$C$\underline{H}_2$O)$_n$H, C$\underline{H}$O(C$\underline{H}_2$C$\underline{H}_2$O)$_n$—, —C

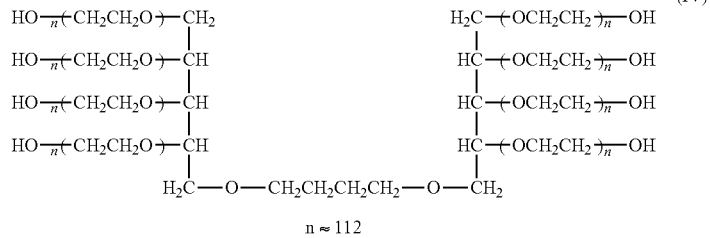

(IV)

n ≈ 112

Example 2: Synthesis of p-Nitrophenyl Carbonate Body (VII): Case of Molecular Weight of about 5,000

After 20 g (4 mmol) of the compound (I) obtained in the above Example 1-3 and 80 g of dehydrated toluene were charged into a 200 ml round-bottom flask fitted with a thermometer, a nitrogen-inlet tube, and a stirrer and PEG was dissolved under a nitrogen atmosphere, the whole was heated and refluxed at 110° C. to remove moisture. After cooling, 4.9 g (48 mmol) of triethylamine and 8.4 g (41.6

$\underline{H}_2$—OCH$_2$CH$_2$CH$_2$CH$_2$O—C$\underline{H}_2$—), 4.44 (16H, t, —OCH$_2$C$\underline{H}_2$OCOO PhNO$_2$), 7.40 (16H, d, —P$\underline{h}$NO$_2$), 8.28 (16H, d, —P$\underline{h}$NO$_2$)

GPC analysis (DMF system) ... main fraction: 99.2%, Mn: 3,853, Mw: 3,929, Mw/Mn: 1.020, Mp: 4,005

Molecular weight (TOF-MS); 6,291

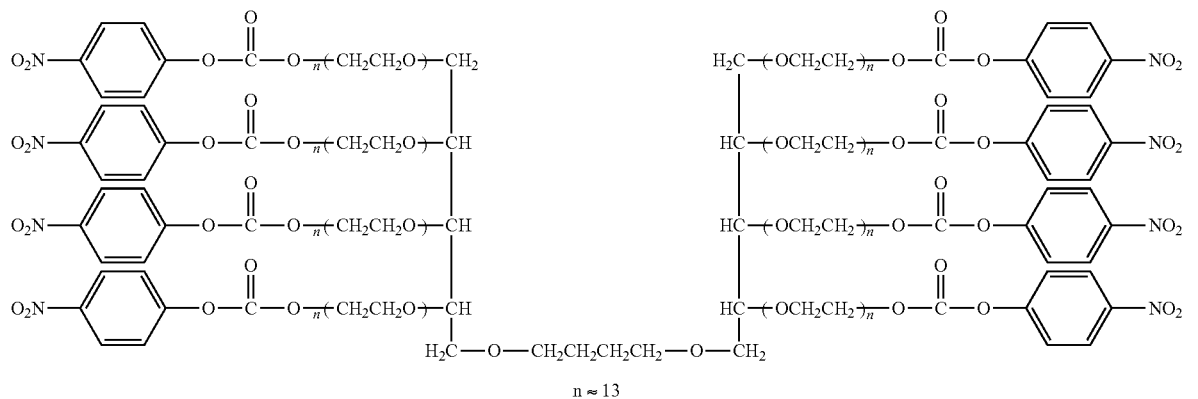

(VII)

n ≈ 13

Example 3-1: Synthesis of Cyanoethyl Body: Case of Molecular Weight of about 10,000

To a 500 ml round-bottom flask fitted with a thermometer, a nitrogen-inlet tube, and a stirrer, 30 g (3 mmol) of the compound (II) obtained in the above Example 1-4 and 30 g of ion-exchanged water were added, and the whole was heated to 40° C. to achieve dissolution. After the dissolution, the whole was cooled to 10° C. or lower and 3 g of a 50% aqueous potassium hydroxide solution was added thereto. Subsequently, while the temperature was kept at 5 to 10° C., 25.5 g (480 mmol) of acrylonitrile was added dropwise over a period of 2 hours. After completion of the dropwise addition, the reaction was further conducted for 4 hours and, after 30 g of ion-exchanged water was added, neutralization was achieved by adding 1.8 g of an 85% aqueous phosphoric acid solution. After 45 g of ethyl acetate was added and the whole was stirred, it was allowed to stand and an upper ethyl acetate layer was discarded. The extraction with ethyl acetate was repeated nine times. After completion of the extraction, extraction with 150 g of chloroform was performed. The resulting chloroform layer was dried over 15 g of magnesium sulfate and, after filtration, was concentrated. The concentrated liquid was dissolved with adding 90 g of ethyl acetate, and hexane was added until crystals were precipitated. The crystals were collected by filtration and again dissolved in 90 g of ethyl acetate and, after cooling to room temperature, hexane was added until crystals were precipitated. The crystals were collected by filtration and dried to obtain the following cyanoethyl body (VIII).

$^1$H-NMR (CDCl$_3$, internal standard: TMS)
δ (ppm):
1.57 (4H, br, —OCH$_2$C$\underline{H}_2$C$\underline{H}_2$CH$_2$—O—), 2.63 (16H, t, —C$\underline{H}_2$CH$_2$CN), 3.39 (4H, br, —OC$\underline{H}_2$CH$_2$CH$_2$C$\underline{H}_2$—O—), 3.50-3.80 (894H, m, —C$\underline{H}_2$O (C$\underline{H}_2$C$\underline{H}_2$O)$_n$H, C$\underline{H}$O(C$\underline{H}_2$C$\underline{H}_2$O)$_n$H, —C$\underline{H}_2$—OCH$_2$CH$_2$CH$_2$CH$_2$O—C$\underline{H}_2$—, —CH$_2$C$\underline{H}_2$CN)

of toluene, and 1.2 g of nickel (5136p manufactured by N. E. MCAT Company) were added, and the whole was heated to 60° C. Pressurization was performed with ammonia until inner pressure reached 1 MPa and thereafter, hydrogen was introduced to achieve pressurization until the inner pressure reached 4.5 MPa, followed by reaction at 130° C. for 3 hours. After the reaction, the reaction solution was cooled to 80° C. and purging with nitrogen was repeated until ammonia odor disappeared. All the amount of the reaction solution was taken out and filtrated. After the filtrate was cooled to room temperature, hexane was added until crystals were precipitated. The crystals were collected by filtration and dried to obtain the following amine body (IX).

$^1$H-NMR (CDCl$_3$, internal standard: TMS)

δ (ppm):

1.57 (4H, br, —OCH$_2$C$\underline{H}_2$C$\underline{H}_2$CH$_2$—O—), 1.72 (16H, quint, —CH$_2$C$\underline{H}_2$CH$_2$NH$_2$), 2.79 (16H, t, —CH$_2$CH$_2$C$\underline{H}_2$NH$_2$), 3.39 (4H, br, —OC$\underline{H}_2$CH$_2$CH$_2$C$\underline{H}_2$—O—), 3.50-3.80 (894H, m, —C$\underline{H}_2$O (C$\underline{H}_2$C$\underline{H}_2$O)$_n$H, C$\underline{H}$O(C$\underline{H}_2$C

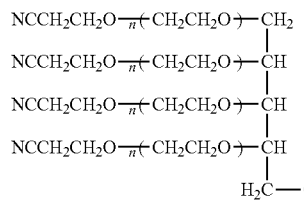

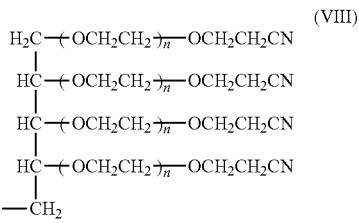

(VIII)

n ≈ 27

Example 3-2: Synthesis of Propylamino Body: Case of Molecular Weight of about 10,000

To a 1 L autoclave, 13 g of the cyanoethyl body, i.e., the compound (VIII) obtained in the above Example 3-1, 560 g H$_2$O)$_n$H, —C$\underline{H}_2$—OCH$_2$CH$_2$CH$_2$CH$_2$O—C$\underline{H}_2$—, —C$\underline{H}_2$CH$_2$CH$_2$NH$_2$)

GPC analysis (water system) . . . main fraction: 97.9%, Mn: 6,334, Mw: 6,477, Mw/Mn: 1.022, Mp: 6,571

Molecular weight (TOF-MS); 10,510

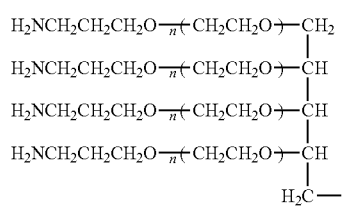

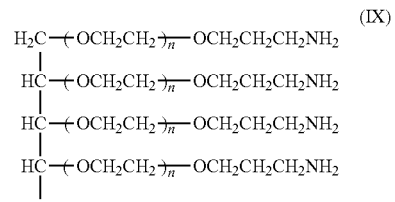

(IX)

n ≈ 27

Example 4: Synthesis of Glutaric Acid NHS Body: Case of Molecular Weight of about 20,000

To a 200 ml round-bottom flask fitted with a thermometer, a nitrogen-inlet tube, and a stirrer, 25 g (1.25 mmol) of the compound (III) obtained in the above Example 1-5, 25 mg of BHT, 125 mg of sodium acetate, and 60 g of toluene were added, and PEG was dissolved under a nitrogen atmosphere. Thereafter, the whole was heated and refluxed at 110° C. to remove moisture. After cooling, 1.71 g (15.0 mmol) of glutaric anhydride was added, followed by reaction at 110° C. for 8 hours. Then, the reaction solution was cooled to 40° C. and 3.45 g (30.0 mmol) of N-hydroxysuccinimide and 4.33 g (21.0 mmol) of 1,3-dicyclohexylcarbodiimide were added, followed by reaction for 3 hours. After 3 hours, the reaction solution was filtrated and hexane was added to the filtrate until crystals were precipitated. The crystals were collected by filtration and dissolved in ethyl acetate under heating. Thereafter, hexane was added until crystals were precipitated and the crystals were collected by filtration and dried to obtain the objective compound (X).

$^1$H-NMR (CDCl$_3$, internal standard: TMS)
δ (ppm):
1.57 (4H, br, —OCH$_2$C$\underline{H}_2$C$\underline{H}_2$CH$_2$—O—), 2.07 (16H, quint, —CH$_2$C$\underline{H}_2$CH$_2$C(O)O—), 2.50 (16H, t, —C$\underline{H}_2$CH$_2$CH$_2$C(O)O—), 2.72 (16H, t, —CH$_2$CH$_2$C$\underline{H}_2$C(O)O—), 2.84 (32H, br, —C(O)C$\underline{H}_2$C$\underline{H}_2$C(O)—), 3.40 (4H, br, —OCH$_2$CH$_2$CH$_2$C$\underline{H}_2$—O—), 3.51-3.64 (1758H, m, —C$\underline{H}_2$O (C$\underline{H}_2$C$\underline{H}_2$O)$_n$H, C$\underline{H}$O(C$\underline{H}_2$C$\underline{H}_2$O)$_n$H, —C$\underline{H}_2$—OCH$_2$CH$_2$CH$_2$O—C$\underline{H}_2$—), 4.25 (16H, t, —OCH$_2$C$\underline{H}_2$OC(O)—)

GPC analysis (DMF system) . . . main fraction: 97.5%, Mn: 14,711, Mw: 15,116, Mw/Mn: 1.028, Mp: 15,635
Molecular weight (TOF-MS); 21,926

Example 5-1: Synthesis of Hexanoic Acid Body: Case of Molecular Weight of about 40,000

To a 1,000 ml round-bottom flask fitted with a thermometer, a nitrogen-inlet tube, and a stirrer, the compound (IV) obtained in Example 1-6, 60 g of flaky potassium hydroxide, and 600 g of toluene were added, and dissolution was achieved under a nitrogen atmosphere. Thereafter, 40.2 g (180 mmol) of ethyl 6-bromohexanoate was added dropwise at 40° C. with stirring over a period of 2 hours. After completion of the dropwise addition, reaction was carried out for 5 hours. The reaction solution was cooled, 210 g of water for injection was added, and the temperature was elevated to 70° C., thus conducting a hydrolysis reaction for 2 hours. The reaction solution was cooled and 96 g of concentrated hydrochloric acid was added dropwise with stirring under ice cooling, thereby achieving protonation. After the whole was allowed to stand, an organic layer was removed and a step of adding 210 g of ethyl acetate, stirring the whole for 15 minutes, then allowing it to stand, and again removing an organic layer was repeated three times. Thereafter, the resulting aqueous layer was extracted with 150 g of chloroform twice and a combined chloroform layer was dried over 15 g of magnesium sulfate. After the solution was filtrated, chloroform was concentrated and the concentrate was dissolved under heating with adding 210 g of ethyl acetate. Then, 120 g of hexane was added to precipitate crystals. The resulting crystals were collected by filtration and dissolved under heating with adding 210 g of ethyl acetate. Thereafter, 120 g of hexane was added to precipitate crystals again. The resulting crystals were collected by filtration and, after 120 g of hexane was added and the whole was stirred, the crystals were collected by filtration and dried under vacuum to obtain 26 g of the following compound δ (ppm):
(XI). $^1$H-NMR (CDCl$_3$, internal standard: TMS)
1.42 (16H, quint, —OCH$_2$CH$_2$C$\underline{H}_2$CH$_2$CH$_2$C(O)O—), 1.58-1.68 (36H, m, —OCH$_2$C$\underline{H}_2$CH$_2$C$\underline{H}_2$CH$_2$C(O)O—,

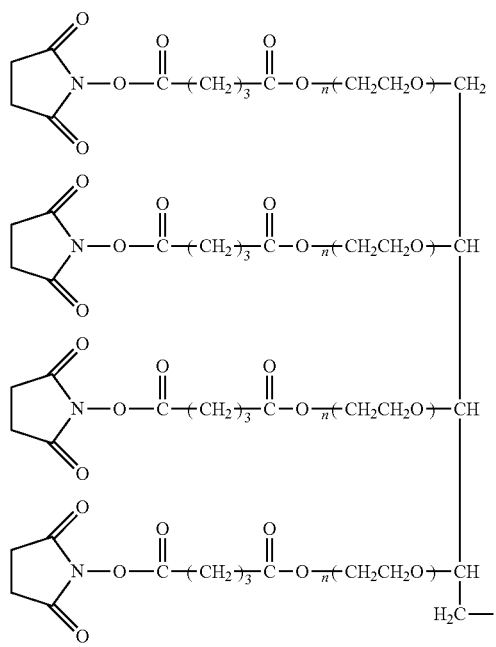

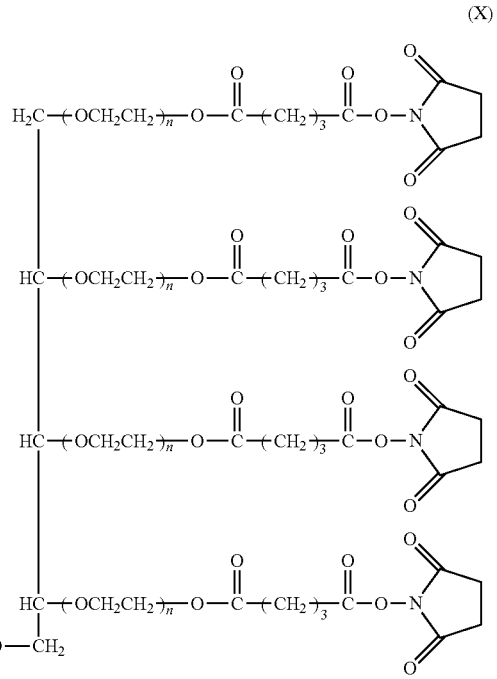

—OCH₂CH₂CH₂CH₂—O—), 2.32 (16H, t, —OCH₂CH₂CH₂CH₂CH₂C(O)O—), 3.40 (4H, br, —OCH₂CH₂CH₂CH₂—O—), 3.51-3.84 (3614H, m, —CH₂O(CH₂CH₂O)ₙH, CHO(CH₂CH₂O)ₙH, —CH₂—OCH₂CH₂CH₂CH₂O—CH₂—, —OCH₂CH₂CH₂CH₂CH₂C(O)O—)

lected by filtration and dried to obtain the objective compound (XII).

¹H-NMR (CDCl₃, internal standard: TMS)
δ (ppm):
1.47 (16H, quint, —OCH₂CH₂CH₂CH₂CH₂C(O)O—), 1.57 (4H, br, —OCH₂CH₂CH₂CH₂—O—), 1.62 (16H, (XI)

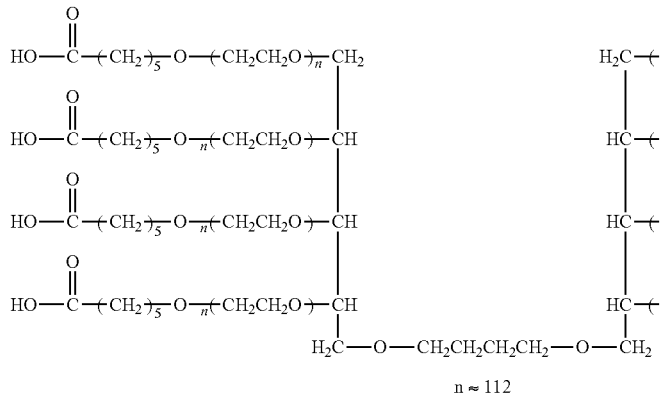
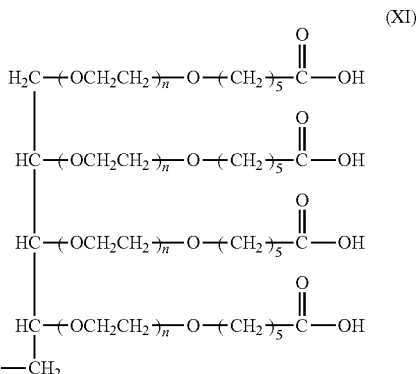

n ≈ 112

Example 5-2: Synthesis of Hexanoic Acid NHS Body: Case of Molecular Weight of about 40,000

To a 200 ml round-bottom flask fitted with a thermometer, a nitrogen-inlet tube, and a stirrer, 25 g (0.625 mmol) of the compound (XI) obtained in Example 1-5 and 75 g of toluene were added, and PEG was dissolved under a nitrogen atmosphere. Thereafter, 1.23 g (10.5 mmol) of N-hydroxysuccinimide and 2.09 g (10.0 mmol) of 1,3-dicyclohexylcarbodiimide were added, followed by reaction at 40° C. for 2 hours. After 2 hours, the reaction solution was filtrated and hexane was added to the filtrate until crystals were precipitated. The crystals were collected by filtration and dissolved in ethyl acetate under heating. Thereafter, hexane was added until crystals were precipitated and the crystals were collected by filtration and dried to obtain the objective compound (XII).

quint, —OCH₂CH₂CH₂CH₂CH₂C(O)O—), 1.77 (16H, quint, —OCH₂CH₂CH₂CH₂CH₂C(O)O—), 2.61 (16H, t, —OCH₂CH₂CH₂CH₂CH₂C(O)O—), 2.84 (32H, br, —C(O)CH₂CH₂C(O)—), 3.40 (4H, br, —OCH₂CH₂CH₂CH₂—O—), 3.51-3.64 (3614H, m, —CH₂O(CH₂CH₂O)ₙ, CHO(CH₂CH₂O)ₙ, —CH₂—OCH₂CH₂CH₂CH₂O—CH₂—, —OCH₂CH₂CH₂CH₂CH₂C(O)O—)

GPC analysis (DMF system) . . . main fraction: 92.5%, Mn: 28,303, Mw: 29,013, Mw/Mn: 1.025, Mp: 29,898

Molecular weight (TOF-MS); 43,248

(XII)

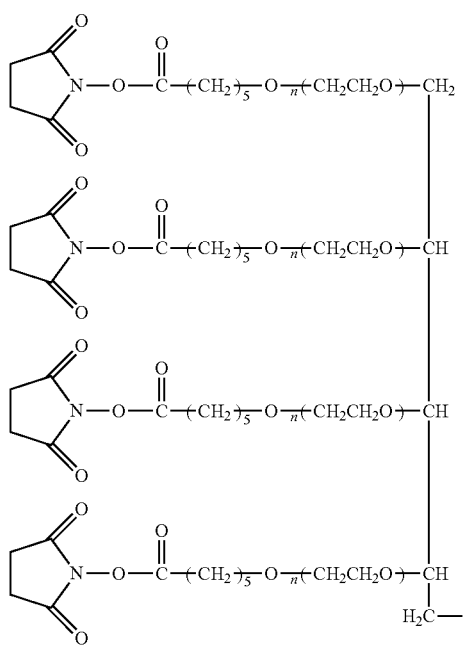
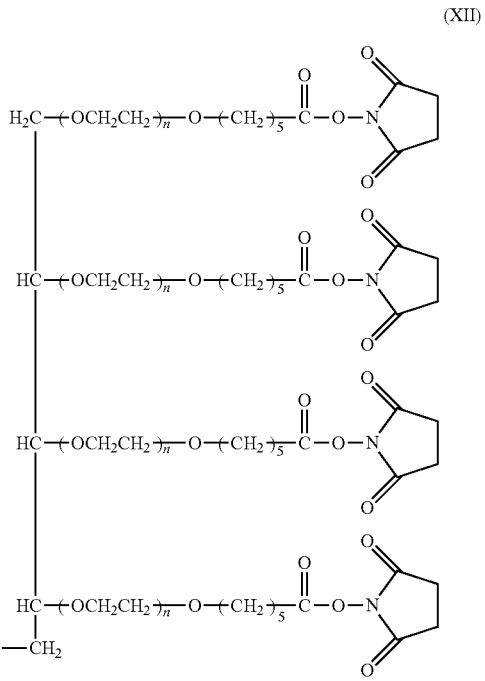

n ≈ 112

Comparative Example 1: Synthesis of Hexaglycerol Polyethylene Glycol Ethers (XIII), (XIV), (XV), (XVI): Cases of Molecular Weight of about, 5,000, 10,000, 20,000, 40,000

Comparative Example 1-1: Case of Molecular Weight of about 5,000

An aqueous potassium hydroxide solution was prepared by adding 6.7 g of potassium hydroxide, 13.4 g of ion-exchanged water, and 46.9 g of methanol to a 100 ml beaker. 100 g of hexaglycerin was charged into a 5 L autoclave and subsequently, the prepared aqueous potassium hydroxide solution was charged into the 5 L autoclave. After the inside of the system was replaced by nitrogen, the pressure was reduced at 90° C. to perform a dehydration operation over a period of 5 hr. After the inside of the system was replaced by nitrogen, 886 g (20.1 mmol) of ethylene oxide was added at 80 to 150° C. under a pressure of 1 MPa or less, followed by continuation of the reaction for another 1 hour. After the reaction, the whole was cooled to 60° C., 400 g of the reaction solution was taken out of the autoclave, and pH was adjusted to 7.5 with an 85% aqueous phosphoric acid solution to obtain the compound (XIII).

Figure 2:
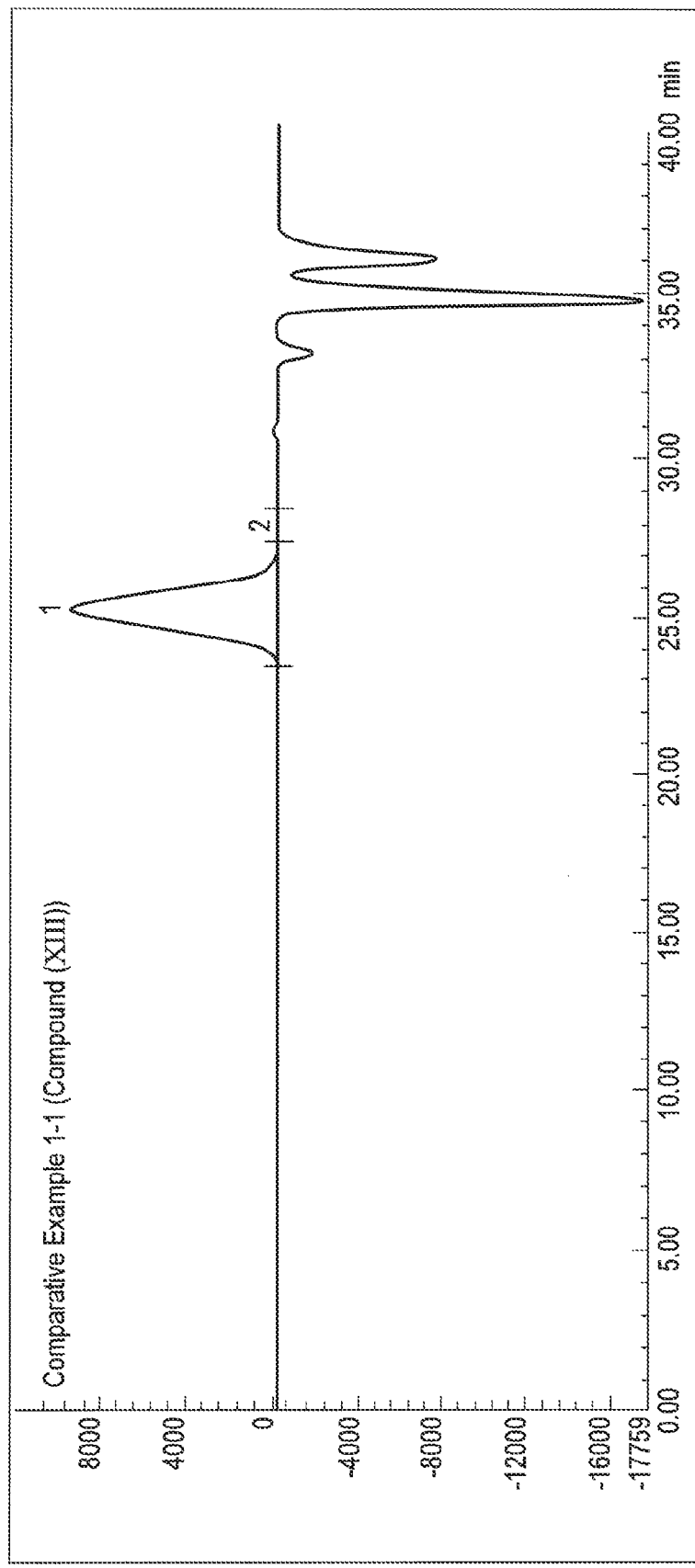
FIG. 2 is a GPC chart of the compound (XIII).

FIG. 2 is a GPC chart of the compound (XIII). $^1$H-NMR (CDCl$_3$, internal standard: TMS)

δ (ppm):

3.45-3.90 (446H, m, —C$\underline{H}_2$O(C$\underline{H}_2$C$\underline{H}_2$O)$_n$H, —OCH$_2$C$\underline{H}$O(C$\underline{H}_2$C$\underline{H}_2$O)$_n$H)

GPC analysis (THF system) . . . main fraction: 99.4%, Mn: 2,936, Mw: 3,218, Mw/Mn: 1.096, Mp: 3,085

Molecular weight measurement (hydroxyl value); 4,847

Comparative Example 1-2: Case of Molecular Weight of about 10,000

To about 582 g of the reaction solution remaining in the reaction vessel in Comparative Example 1-1, 575 g (13.0 mol) of ethylene oxide was added at 80 to 150° C. under a pressure of 1 MPa or less, followed by continuation of the reaction for another 1 hour. After the reaction, the whole was cooled to 60° C., 500 g of the reaction solution was taken out of the vessel and pH was adjusted to 7.5 with an 85% aqueous phosphoric acid solution to obtain the compound (XIV).

$^1$H-NMR (CDCl$_3$, internal standard: TMS)

δ (ppm):

3.45-3.90 (894H, m, —C$\underline{H}_2$O(C$\underline{H}_2$C$\underline{H}_2$O)$_n$H, —OCH$_2$C$\underline{H}$O(C$\underline{H}_2$C$\underline{H}_2$O)$_n$H)

GPC analysis (THF system) . . . main fraction: 98.8%, Mn: 5,864, Mw: 6,257, Mw/Mn: 1.067, Mp: 6,192

Molecular weight measurement (hydroxyl value); 10,074

Comparative Example 1-3: Case of Molecular Weight of about 20,000

To about 657 g of the reaction solution remaining in the reaction vessel in Comparative Example 1-2, 655 g (14.9 mol) of ethylene oxide was added at 80 to 150° C. under a pressure of 1 MPa or less, followed by continuation of the reaction for another 1 hour. After the reaction, the whole was cooled to 60° C., 600 g of the reaction solution was taken out of the vessel and pH was adjusted to 7.5 with an 85% aqueous phosphoric acid solution to obtain the compound (XV).

$^1$H-NMR (CDCl$_3$, internal standard: TMS)

δ (ppm):

3.45-3.90 (1790H, m, —C$\underline{H}_2$O(C$\underline{H}_2$C$\underline{H}_2$O)$_n$H, —OC$\underline{H}_2$C$\underline{H}$O(C$\underline{H}_2$C$\underline{H}_2$O)$_n$H)

GPC analysis (THF system) . . . main fraction: 96.7%, Mn: 11,188, Mw: 11,898, Mw/Mn: 1.064, Mp: 11,429

Molecular weight measurement (hydroxyl value); 19,598

Comparative Example 1-4: Case of Molecular Weight of about 40,000

To about 712 g of the reaction solution remaining in the reaction vessel in Comparative Example 1-3, 708 g (16.1 mol) of ethylene oxide was added at 80 to 150° C. under a pressure of 1 MPa or less, followed by continuation of the reaction for another 1 hour. After the reaction, the whole was cooled to 60° C., all the amount of the reaction solution was taken out of the vessel and pH was adjusted to 7.5 with an 85% aqueous phosphoric acid solution to obtain the compound (XVI).

$^1$H-NMR (CDCl$_3$, internal standard: TMS)

δ (ppm):

3.45-3.90 (3614H, m, —C$\underline{H}_2$O(C$\underline{H}_2$C$\underline{H}_2$O)$_n$H, —OC$\underline{H}_2$C$\underline{H}$O(C$\underline{H}_2$C$\underline{H}_2$O)$_n$H)

GPC analysis (THF system) . . . main fraction: 98.6%, Mn: 20,303, Mw: 21,342, Mw/Mn: 1.051, Mp: 22,076

Molecular weight measurement (hydroxyl value); 35,900

Comparative Example 2-1: Synthesis of Cyanoethyl Body: Case of Molecular Weight of about 10,000

To a 3,000 ml round-bottom flask fitted with a thermometer, a nitrogen-inlet tube, and a stirrer, 400 g (40 mmol) of the compound (XIV) obtained in the above Comparative Example 1-2 and 400 g of ion-exchanged water were added, and the whole was heated to 40° C. to achieve dissolution. After the dissolution, the whole was cooled to 10° C. or lower and 40 g of a 50% aqueous potassium hydroxide solution was added thereto. Subsequently, while the temperature was kept at 5 to 10° C., 255 g (4.8 mol) of acrylonitrile was added dropwise over a period of 2 hours. After completion of the dropwise addition, the reaction was further conducted for 4 hours and, after 400 g of ion-exchanged water was added, neutralization was achieved by adding 24 g of an 85% aqueous phosphoric acid solution. After 720 g of ethyl acetate was added and the whole was stirred, it was allowed to stand and an upper ethyl acetate layer was discarded. The extraction with ethyl acetate was repeated nine times. After completion of the extraction, extraction with 530 g of chloroform was performed. The resulting chloroform layer was dried over 80 g of magnesium sulfate and, after filtration, was concentrated. The concentrated liquid was dissolved with adding 1,000 g of ethyl acetate, and hexane was added until crystals were precipitated. The crystals were collected by filtration and again dissolved in 1,000 g of ethyl acetate and, after cooling to room temperature, hexane was added until crystals were precipitated. The crystals were collected by filtration and dried to obtain a cyanoethyl body (XVII).

$^1$H-NMR (CDCl$_3$, internal standard: TMS)

δ (ppm):

2.63 (16H, t, —CH$_2$C$\underline{H}_2$CN), 3.45-3.80 (910H, m, —C$\underline{H}_2$O (C$\underline{H}_2$C$\underline{H}_2$O)$_n$H, —OC$\underline{H}_2$C$\underline{H}$O(C$\underline{H}_2$C$\underline{H}_2$O)$_n$H, —C$\underline{H}_2$CH$_2$CN)

Molecular weight measurement (hydroxyl value); 10,498

Comparative Example 2-2: Synthesis of Propylamino Body: Case of Molecular Weight of about 10,000

To a 1 L autoclave, 75 g of the cyanoethyl body, i.e., the compound (XVII) obtained in the above Comparative Example 2-1, 510 g of toluene, and 6.8 g of nickel (5136p manufactured by N. E. MCAT Company) were added, and the temperature was elevated to 60° C. Pressurization was performed with ammonia until inner pressure reached 1 MPa and thereafter, hydrogen was introduced to achieve pressurization until the inner pressure reached 4.5 MPa, followed by reaction at 130° C. for 3 hours. After the reaction, the reaction solution was cooled to 80° C. and purging with nitrogen was repeated until ammonia odor disappeared. All the amount of the reaction solution was taken out and filtrated. After the filtrate was cooled to room temperature, hexane was added until crystals were precipitated. The crystals were collected by filtration and dried to obtain an amine body (XVIII).

$^1$H-NMR (CDCl$_3$, internal standard: TMS)
δ (ppm):
1.77 (16H, quint, —CH$_2$C$\underline{H}_2$CH$_2$NH$_2$), 2.74 (16H, t, —CH$_2$CH$_2$C$\underline{H}_2$NH$_2$), 3.62-3.90 (910H, m, —C$\underline{H}_2$O(C$\underline{H}_2$C$\underline{H}_2$O)$_n$H, —OC$\underline{H}_2$C$\underline{H}$O(C$\underline{H}_2$C$\underline{H}_2$O)$_n$H, —CH$_2$CH$_2$NH$_2$)
GPC analysis (water system) . . . main fraction: 96.8%, Mn: 5,832, Mw: 6,387, Mw/Mn: 1.095, Mp: 5,821
Molecular weight measurement (hydroxyl value); 10,530

Comparative Example 3: Synthesis of Glutaric Acid NHS Body: Case of Molecular Weight of about 20,000

To a 200 ml round-bottom flask fitted with a thermometer, a nitrogen-inlet tube, and a stirrer, 100 g (5 mmol) of the compound (XV) obtained in Comparative Example 1-3, 100 mg of BHT, 500 mg of sodium acetate, and 150 g of toluene were added, and PEG was dissolved under a nitrogen atmosphere. Thereafter, the whole was heated and refluxed at 110° C. to remove moisture. After cooling, 6.8 g (60 mmol) of glutaric anhydride was added, followed by reaction at 110° C. for 8 hours. Then, the reaction solution was cooled to 40° C. and 13.8 g (120 mmol) of N-hydroxysuccinimide and 17.3 g (84 mmol) of 1,3-dicyclohexylcarbodiimide were added, followed by reaction for 3 hours. After 3 hours, the reaction solution was filtrated and hexane was added to the filtrate until crystals were precipitated. The crystals were collected by filtration and dissolved in ethyl acetate under heating. Thereafter, hexane was added until crystals were precipitated and the crystals were collected by filtration and dried to obtain an objective compound (XIX).

$^1$H-NMR (CDCl$_3$, internal standard: TMS)
δ (ppm):
2.07 (16H, quint, —CH$_2$C$\underline{H}_2$CH$_2$C(O)O—), 2.48 (16H, t, —C$\underline{H}_2$CH$_2$CH$_2$C(O)O—), 2.72 (16H, t, —CH$_2$CH$_2$C$\underline{H}_2$C(O)O—), 2.84 (32H, br, —C(O)C$\underline{H}_2$C$\underline{H}_2$C(O)—), 3.51-3.64 (1774H, m, —C$\underline{H}_2$O (C$\underline{H}_2$C$\underline{H}_2$O)$_n$H, —OC$\underline{H}_2$C$\underline{H}$O(C$\underline{H}_2$C$\underline{H}_2$O)$_n$H), 4.25 (16H, t, —OCH$_2$C$\underline{H}_2$OC(O)—)
GPC analysis (DMF system) . . . main fraction: 97.7%, Mn: 16,386, Mw: 18,001, Mw/Mn: 1.099, Mp: 16,701
Molecular weight measurement (hydroxyl value); 21,286
FIGS. 1 and 2 show results of analyzing the compound (I) obtained in Example 1-3 and the compound (VIII) obtained in Comparative Example 1-1 on GPC. Moreover, Table 1 summarizes results of polydispersity (Mw/Mn) of the main fraction obtained from GPC analysis in each of Examples 1-3 to 6, 3-2, and 4 and Comparative Examples 1-1 to 4, 2-2, and 3.

As shown in FIGS. 1 and 2 and Table 1, the multi-arm polyethylene glycol derivatives of the invention and intermediates thereof have a small polydispersity, so that it is shown that the molecular weight distribution is extremely narrow. On the other hand, the multi-arm polyethylene glycols synthesized from hexaglycerin have a very large polydispersity, so that it is shown that they are polyethylene glycols having a broad molecular weight distribution.

TABLE 1

| Compound | | Molecular weight | End functional group | Mw/Mn |
|---|---|---|---|---|
| Example 1-3 | (I) | 5,000 | Hydroxyl group | 1.016 |
| Comparative Example 1-1 | (XIII) | | | 1.096 |
| Example 1-4 | (II) | 10,000 | | 1.016 |
| Comparative Example 1-2 | (XIV) | | | 1.067 |
| Example 1-5 | (III) | 20,000 | | 1.014 |
| Comparative Example 1-3 | (XV) | | | 1.064 |
| Example 1-6 | (IV) | 40,000 | | 1.017 |
| Comparative Example 1-4 | (XVI) | | | 1.051 |
| Example 3-2 | (IX) | 10,000 | Propylamino group | 1.022 |
| Comparative Example 2-2 | (XVIII) | | | 1.095 |
| Example 4 | (X) | 20,000 | Glutaric acid NHS group | 1.028 |
| Comparative Example 3 | (XIX) | | | 1.099 |

While the invention has been described in detail and with reference to specific embodiments thereof, it will be apparent to one skilled in the art that various changes and modifications can be made therein without departing from the spirit and scope thereof.

The invention claimed is:
1. An intermediate of a multi-arm polyethylene glycol derivative, which is represented by the following formula (4):

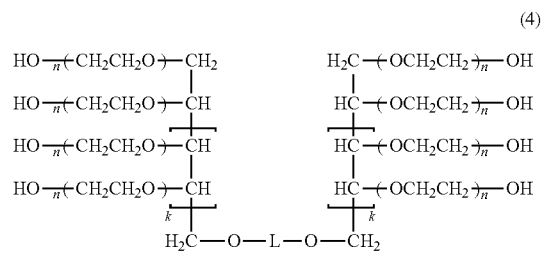

(4)

wherein L represents a group selected from a linear or branched alkylene group having 2 to 12 carbon atoms, an arylene group having 6 to 12 carbon atoms, or a cycloalkylene group having 5 to 12 carbon atoms and combinations thereof, which may be alkyleneoxyalkylene or aryleneoxyalkylene in case of an ether bond in a chain; k represents 1 or 2; n is the average addition molar number of oxyethylene groups and n represents an integer between 3 and 600.
2. The intermediate according to claim 1, which is represented by the following formula (5):

(5)

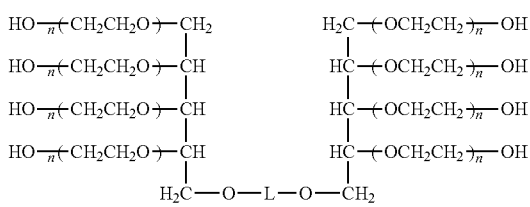

wherein L and n are defined in claim 1.

3. The intermediate according to claim 1, wherein polydispersity Mw/Mn satisfies the relationship of Mw/Mn≤1.05 in gel permeation chromatography.

4. A method for producing the intermediate according to claim 1, the method comprising all the steps of the following (A), (B), and (C) in the order:

Step (A): a step of linking two molecules of a compound represented by the formula (6) to a compound represented by the formula (7) by an etherification reaction to obtain a compound represented by the formula (8):

(6)

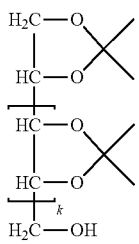

wherein k represents 1 or 2;

A-L-A          (7)

wherein L represents a group selected from a linear or branched alkylene group having 2 to 12 carbon atoms, an arylene group having 6 to 12 carbon atoms, or a cycloalkylene group having 5 to 12 carbon atoms and combinations thereof, which may have an ether bond in a chain; and A represents a halogen atom selected from chlorine, bromine, and iodine or a sulfone-based protective group;

(8)

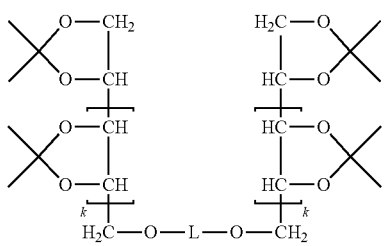

wherein L represents a group selected from a linear or branched alkylene group having 2 to 12 carbon atoms, an arylene group having 6 to 12 carbon atoms, or a cycloalkylene group having 5 to 12 carbon atoms and combinations thereof, which may be alkyleneoxyalkyene or aryleneoxyalkylene in case of an ether bond in a chain; and k represents 1 or 2;

Step (B): a step of obtaining a compound represented by the formula (9) by acid hydrolysis of the compound represented by the formula (8):

(9)

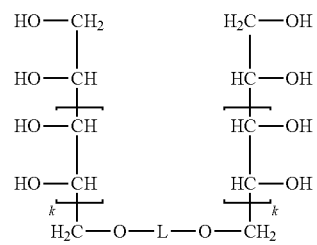

wherein L represents a group selected from a linear or branched alkylene group having 2 to 12 carbon atoms, an arylene group having 6 to 12 carbon atoms, or a cycloalkylene group having 5 to 12 carbon atoms and combinations thereof, which may be alkyleneoxyalkyene or aryleneoxyalkylene in case of an ether bond in a chain; and k represents 1 or 2;

Step (C): a step of adding ethylene oxide to the compound represented by the formula (9) using one or more compounds selected from the group consisting of potassium hydroxide, sodium hydroxide, sodium methoxide, metal sodium, metal potassium, and potassium t-butoxide as a catalyst in the presence of an organic solvent to obtain an intermediate of a polyethylene glycol derivative represented by the formula (4):

(4)

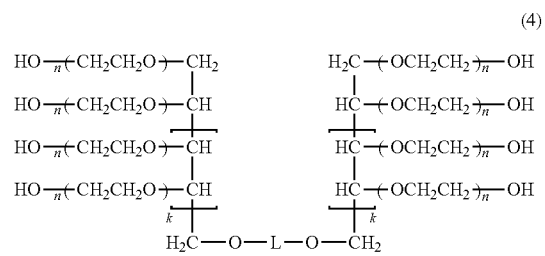

wherein L represents a group selected from a linear or branched alkylene group having 2 to 12 carbon atoms, an arylene group having 6 to 12 carbon atoms, or a cycloalkylene group having 5 to 12 carbon atoms and combinations thereof, which may be alkyleneoxyalkyene or aryleneoxyalkylene in case of an ether bond in a chain; k represents 1 or 2; n is the average addition molar number of oxyethylene groups and n represents an integer between 3 and 600.

* * * * *